(12) United States Patent
Polchin

(10) Patent No.: US 8,257,157 B2
(45) Date of Patent: Sep. 4, 2012

(54) PHYSICAL DATA BUILDING BLOCKS SYSTEM FOR VIDEO GAME INTERACTION

(76) Inventor: George C. Polchin, Santa Barbara, CA (US)

(*) Notice: Subject to any disclaimer, the term of this patent is extended or adjusted under 35 U.S.C. 154(b) by 565 days.

(21) Appl. No.: 12/364,709

(22) Filed: Feb. 3, 2009

(65) Prior Publication Data
US 2009/0197658 A1 Aug. 6, 2009

Related U.S. Application Data

(60) Provisional application No. 61/025,982, filed on Feb. 4, 2008.

(51) Int. Cl.
A63F 9/24 (2006.01)
(52) U.S. Cl. .......................................... 463/9
(58) Field of Classification Search ............... 463/9, 36, 463/37
See application file for complete search history.

(56) References Cited

U.S. PATENT DOCUMENTS

| 5,850,762 | A | 12/1998 | Kochanneck |
| 6,157,872 | A | 12/2000 | Michael |
| 6,290,565 | B1 | 9/2001 | Galyean, III et al. |
| 6,454,624 | B1 | 9/2002 | Duff et al. |
| 6,526,375 | B1 | 2/2003 | Frankel et al. |
| 6,546,315 | B1 | 4/2003 | Michael |
| 6,752,680 | B1 | 6/2004 | Hansen |
| 7,307,638 | B2 * | 12/2007 | Leather et al. ............... 345/582 |
| 2002/0058235 | A1 | 5/2002 | Dinnerstein |
| 2002/0196250 | A1 * | 12/2002 | Anderson et al. ............. 345/420 |
| 2003/0096511 | A1 | 5/2003 | Nguyen |
| 2003/0097203 | A1 | 5/2003 | Michael |
| 2006/0010681 | A1 | 5/2006 | Tincenko |
| 2007/0262984 | A1 * | 11/2007 | Pruss ........................... 345/420 |

FOREIGN PATENT DOCUMENTS

| WO | WO0186625 A2 | 11/2001 |
| WO | WO0186626 A2 | 11/2001 |
| WO | WO0186627 A2 | 11/2001 |
| WO | WO0186628 A2 | 11/2001 |
| WO | WO0186629 A2 | 11/2001 |
| WO | WO0186630 A2 | 11/2001 |

* cited by examiner

Primary Examiner — Brook Kebede
(74) Attorney, Agent, or Firm — Felix L. Fischer

(57) ABSTRACT

A system for video game physical interaction is provided for a host device with an associated interactive application by a plurality of physical building blocks each having at least one input connection point and one output connection point operable for connection to one or more of the remaining blocks. Detectable connection paths through the plurality of blocks allow determination of the shape of a structure created by the blocks and interfacing of the connection paths of the plurality of blocks to the host device creates an input to the interactive application. The application is then altered responsive to the connection paths.

25 Claims, 26 Drawing Sheets

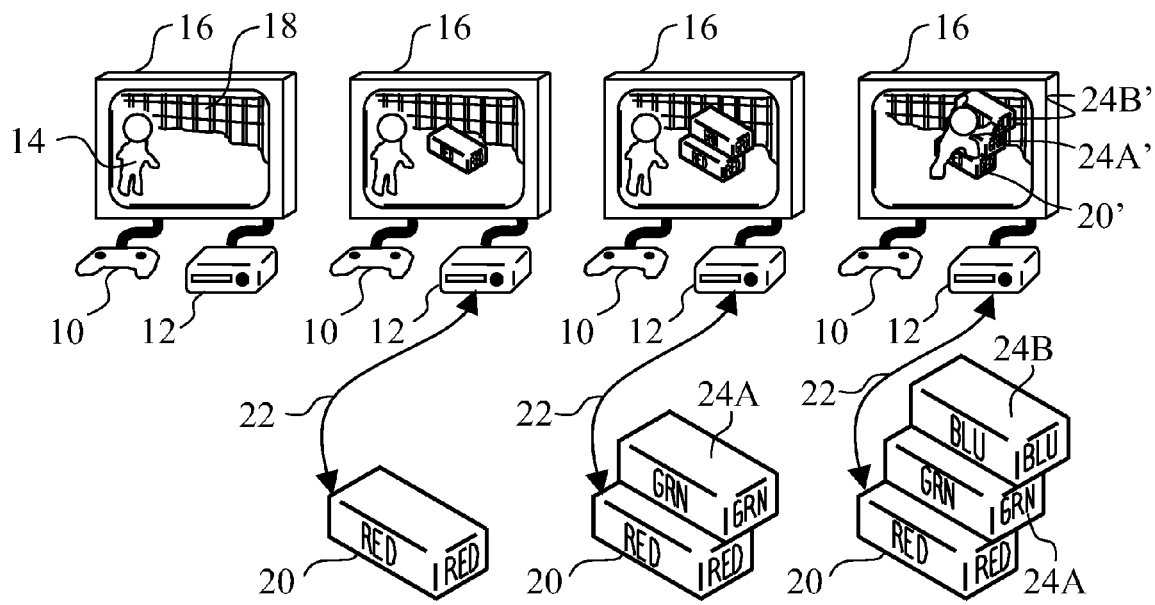
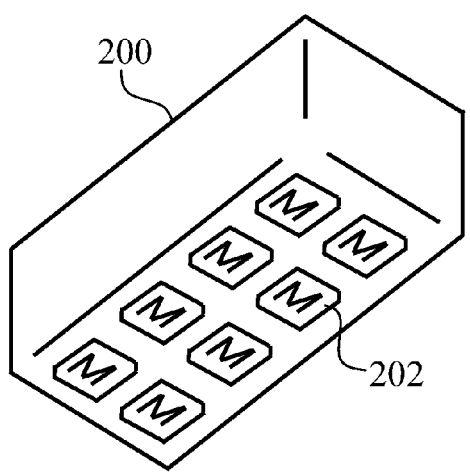
FIG. 2A
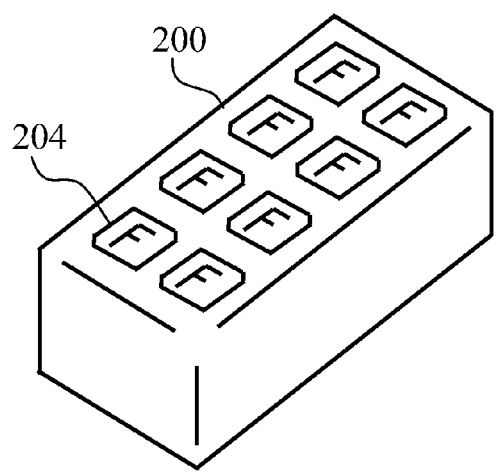
FIG. 2B

| portNum | List of addresses of all blocks that can be communicated with via this port |
|---|---|
| 00 | 0FE1. 0F45. 0F49 |
| 01 | 0FE1. 0F45 |
| 02 | 0FE2 |
| 03 | 0FE2. 0F49 |
| 04 | 13D5. 1356 |
| 05 | 13D5. 1356 |
| 06 | |
| 07 | |

FIG. 13

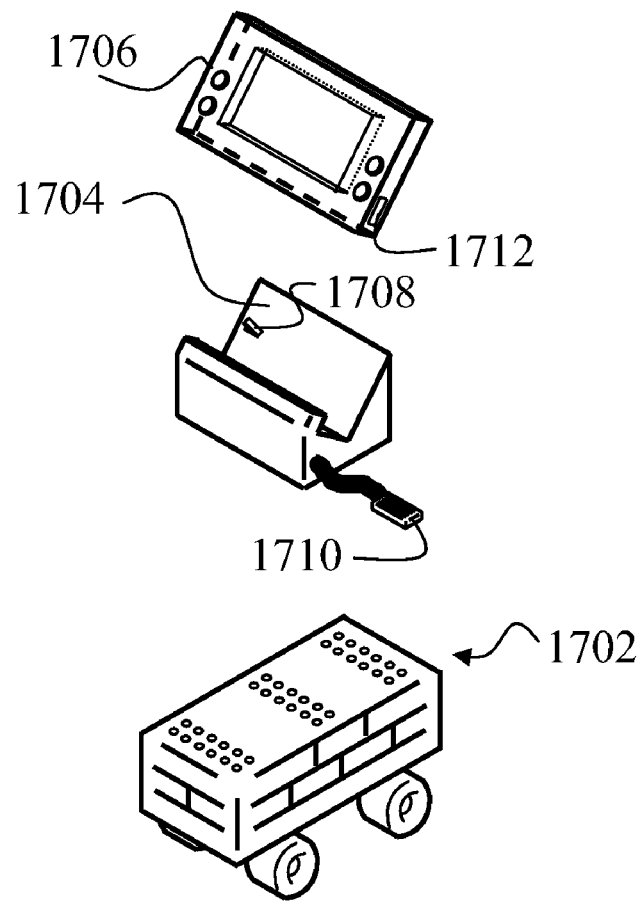
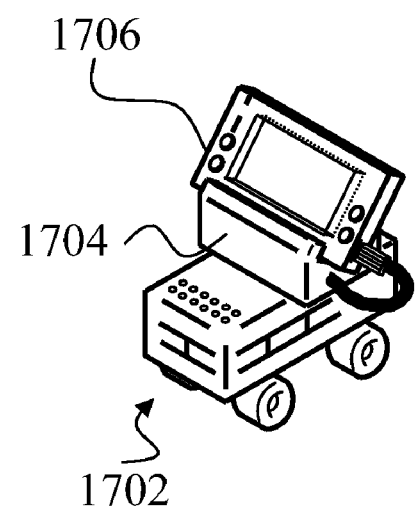
FIG. 17A
FIG. 17B

|  | This block's comm port(s): | | | Is (Are) connected to this block's comm port(s): | | |
|---|---|---|---|---|---|---|
| MAP ENTRY NUM | BLOCK ID 2302 | PORTNUM 2304 | BLOCK KEY-CODE 2306 | BLOCK ID 2308 | PORTNUM 2310 | BLOCK KEY-CODE 2312 |
| 00 | BASE ID | 00 | RED 2X2 | | | |
| 01 | BASE ID | 01 | RED 2X2 | | | |
| 02 | BASE ID | 02 | RED 2X2 | | | |
| 03 | BASE ID | 03 | RED 2X2 | | | |
| 04 | BASE ID | 04 | RED 2X2 | | | |
| 05 | BASE ID | 05 | RED 2X2 | | | |
| 06 | BASE ID | 06 | RED 2X2 | | | |
| 07 | BASE ID | 07 | RED 2X2 | | | |

FIG. 23

|  | This block's comm port(s): | | | Is (Are) connected to this block's comm port(s): | | |
|---|---|---|---|---|---|---|
| MAP ENTRY NUM | BLOCK ID 2302 | PORTNUM 2304 | BLOCK KEY-CODE 2306 | BLOCK ID 2308 | PORTNUM 2310 | BLOCK KEY-CODE 2312 |
| 00 | BASE ID | 00 | RED 2X2 | NOTCONN'D | | |
| 01 | BASE ID | 01 | RED 2X2 | NOTCONN'D | | |
| 02 | BASE ID | 02 | RED 2X2 | NOTCONN'D | | |
| 03 | BASE ID | 03 | RED 2X2 | NOTCONN'D | | |
| 04 | BASE ID | 04 | RED 2X2 | NOTCONN'D | | |
| 05 | BASE ID | 05 | RED 2X2 | NOTCONN'D | | |
| 06 | BASE ID | 06 | RED 2X2 | NOTCONN'D | | |
| 07 | BASE ID | 07 | RED 2X2 | NOTCONN'D | | |

FIG. 24

| MAP ENTRY NUM | This block's comm port(s): | | | Is (Are) connected to this block's comm port(s): | | |
|---|---|---|---|---|---|---|
| | BLOCK ID 2302 | PORTNUM 2304 | BLOCK KEY-CODE 2306 | BLOCK ID 2308 | PORTNUM 2310 | BLOCK KEY-CODE 2312 |
| 00 | BASE ID | 00 | RED 2X2 | 0FE1 | 07 | GRN 2X2 |
| 01 | BASE ID | 01 | RED 2X2 | 0FE1 | 06 | GRN 2X2 |
| 02 | BASE ID | 02 | RED 2X2 | NOTCONN'D | | |
| 03 | BASE ID | 03 | RED 2X2 | NOTCONN'D | | |
| 04 | BASE ID | 04 | RED 2X2 | NOTCONN'D | | |
| 05 | BASE ID | 05 | RED 2X2 | NOTCONN'D | | |
| 06 | BASE ID | 06 | RED 2X2 | NOTCONN'D | | |
| 07 | BASE ID | 07 | RED 2X2 | NOTCONN'D | | |
| 08 | 0FE1 | 00 | GRN 2X2 | | | |
| 09 | 0FE1 | 01 | GRN 2X2 | | | |
| 10 | 0FE1 | 02 | GRN 2X2 | | | |
| 11 | 0FE1 | 03 | GRN 2X2 | | | |
| 12 | 0FE1 | 04 | GRN 2X2 | | | |
| 13 | 0FE1 | 05 | GRN 2X2 | | | |
| 14 | 0FE1 | 06 | GRN 2X2 | BASE ID | 01 | RED 2X2 |
| 15 | 0FE1 | 07 | GRN 2X2 | BASE ID | 00 | RED 2X2 |

FIG. 25

| MAP ENTRY NUM | This block's comm port(s): | | | Is (Are) connected to this block's comm port(s): | | |
|---|---|---|---|---|---|---|
| | BLOCK ID | PORTNUM | BLOCK KEY-CODE | BLOCK ID | PORTNUM | BLOCK KEY-CODE |
| 00 | BASE ID | 00 | RED 2X2 | 0FE1 | 07 | GRN 2X2 |
| 01 | BASE ID | 01 | RED 2X2 | 0FE1 | 06 | GRN 2X2 |
| 02 | BASE ID | 02 | RED 2X2 | 0FE2 | 05 | BLU 2X2 |
| 03 | BASE ID | 03 | RED 2X2 | 0FE2 | 04 | BLU 2X2 |
| 04 | BASE ID | 04 | RED 2X2 | | | |
| 05 | BASE ID | 05 | RED 2X2 | | | |
| 06 | BASE ID | 06 | RED 2X2 | | | |
| 07 | BASE ID | 07 | RED 2X2 | | | |
| 08 | 0FE1 | 00 | GRN 2X2 | | | |
| 09 | 0FE1 | 01 | GRN 2X2 | | | |
| 10 | 0FE1 | 02 | GRN 2X2 | | | |
| 11 | 0FE1 | 03 | GRN 2X2 | | | |
| 12 | 0FE1 | 04 | GRN 2X2 | | | |
| 13 | 0FE1 | 05 | GRN 2X2 | | | |
| 14 | 0FE1 | 06 | GRN 2X2 | BASE ID | 01 | RED 2X2 |
| 15 | 0FE1 | 07 | GRN 2X2 | BASE ID | 00 | RED 2X2 |
| 16 | 0FE2 | 00 | BLU 2X2 | | | |
| 17 | 0FE2 | 01 | BLU 2X2 | | | |
| 18 | 0FE2 | 02 | BLU 2X2 | | | |
| 19 | 0FE2 | 03 | BLU 2X2 | | | |
| 20 | 0FE2 | 04 | BLU 2X2 | BASE ID | 03 | RED 2X2 |
| 21 | 0FE2 | 05 | BLU 2X2 | BASE ID | 02 | RED 2X2 |
| 22 | 0FE2 | 06 | BLU 2X2 | | | |
| 23 | 0FE2 | 07 | BLU 2X2 | | | |

FIG. 26

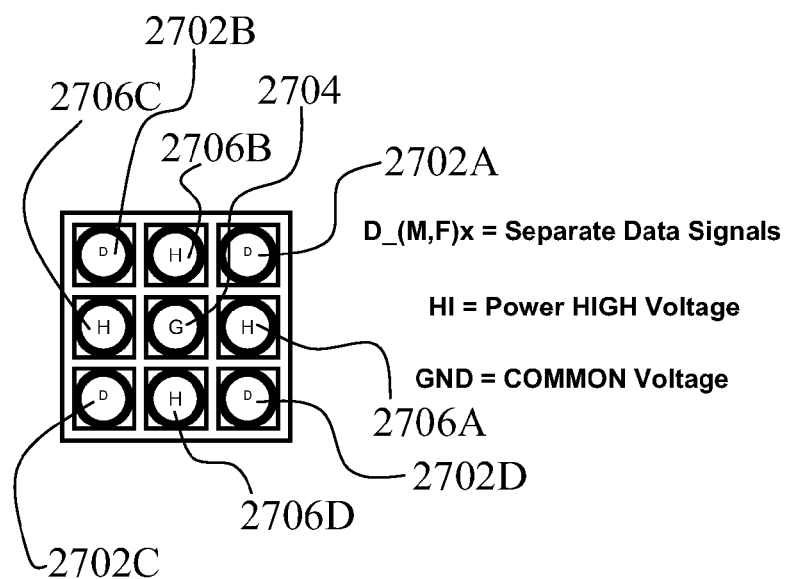
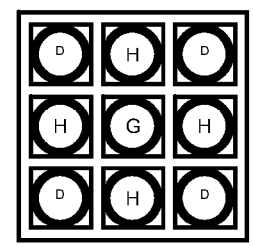
FIG 27A  FIG 27B
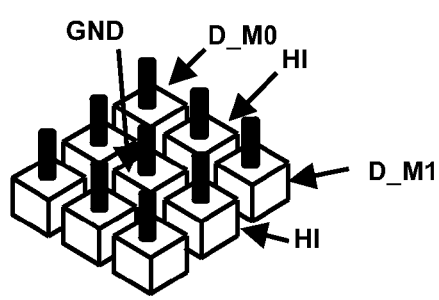
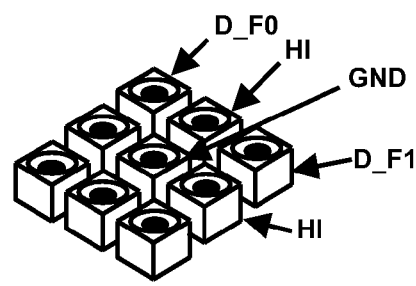
FIG 27C  FIG 27D

PHYSICAL DATA BUILDING BLOCKS SYSTEM FOR VIDEO GAME INTERACTION

REFERENCE TO RELATED APPLICATIONS

This application claims priority from U.S. Provisional application Ser. No. 61/025,982 filed on Feb. 4, 2008 by George Polchin having the same title as the present application.

BACKGROUND

1. Field

This embodiments disclosed herein generally relate to model assembly with video game interaction and more specifically to a plurality of blocks which are assembleable into various configurations with orientation sensing and data communications capability for interaction with a video game.

2. Description of the Related Art

Computer video games provide a virtual simulation of various devices and creatures interacting in an environment presented on a screen display. For players of such video games it has become desirable to interact physically with the game to add realism and to provide greater mental stimulation than merely interfacing with the game through a computer keyboard or game controller. The Wii® device by Nintendo allows a game player to create motion and interaction in a video game through physically manipulating a wand type device. Simulation of swords, golf clubs and numerous other devices can be accomplished with the single hand held device.

Children find creation of structures and devices using such building elements as LEGO® building blocks to be stimulating and enjoyable. This form of play provides an excellent creative outlet furthering imagination skills and developing motor skills, geometric perception and sense of achievement through actual building of a physical structure.

Finally, development of simplified robotics system kits such as those provided under the trademark MINDSTORM® have created the ability to assemble robots and other devices which are controllable through a range of motions. Anthropomorphic devices, wheeled vehicles and manipulating devices such as cranes and claws can be assembled and controlled providing highly sophisticated educational capability as well as entertainment.

The ability to assemble a physical structure or device and have the structure or device describe its physical structure to a video game and interact with the video game within the virtual environment provided by the game as well as a physical environment associated with the device is not present in the current art.

It is therefore desirable to provide individual building blocks having communication capability for interaction with a computer video game for physical assembly display and dynamic data interaction. It is further desirable that the individual or assembled blocks have relative orientation sensing capability upon assembly with additional dynamic data generation capability for motion, position or device interaction.

SUMMARY

A system for physical interaction with a video game or similar interactive application is provided for a host device with an associated interactive application by a plurality of physical building blocks each having at least one input connection point and one output connection point operable for connection to one or more of the remaining blocks. Detectable connection paths through the plurality of blocks allow determination of the shape of a structure created by the blocks and interfacing of the connection paths of the plurality of blocks to the video game device creates an input to the interactive application. The interactive application is then altered responsive to the connection paths.

Interactive play with a video game is accomplished in an exemplary embodiment by providing a base block for connection to a video game console and communication with the video game. In alternative embodiments, all blocks may communicate directly with the video game or a first connected block may assume the role of a base block. Multiple blocks with various appearance or function are provided for physical interconnection to the base block. A structure is then created by attachment of the plurality of blocks to the base block. The structure is then read into the video game through the base block and displayed in the virtual world of the video game with the corresponding appearance and function.

DESCRIPTION OF THE DRAWINGS

FIGS. 1A-1D are a depiction of the basic elements of the invention in the real and virtual worlds;

FIGS. 2A and 2B are bottom and top isometric representations of blocks according to an exemplary embodiment of the invention;

FIG. 13 is an example listing of port number attachments created by the connection of blocks as shown in FIG. 12;

FIGS. 17A and 17B are an exploded and assembled isometric view of a cradle base block adapted for receiving a portable game device and an associated structure built from blocks according to the present invention;

FIG. 23 is an exemplary initial connectivity map for a base block;

FIG. 24 is an exemplary connectivity map for a base block with no connections;

FIG. 25 is an exemplary connectivity map for a base block and a first connected standard block as shown in FIG. 22B;

FIG. 26 is an exemplary connectivity map for a base block and two connected standard blocks as shown in FIG. 22C;

FIGS. 27A-27D are top and isometric views of an array connector for determination of block orientation by interconnection of a single connector;

DETAILED DESCRIPTION

Figure 3A:
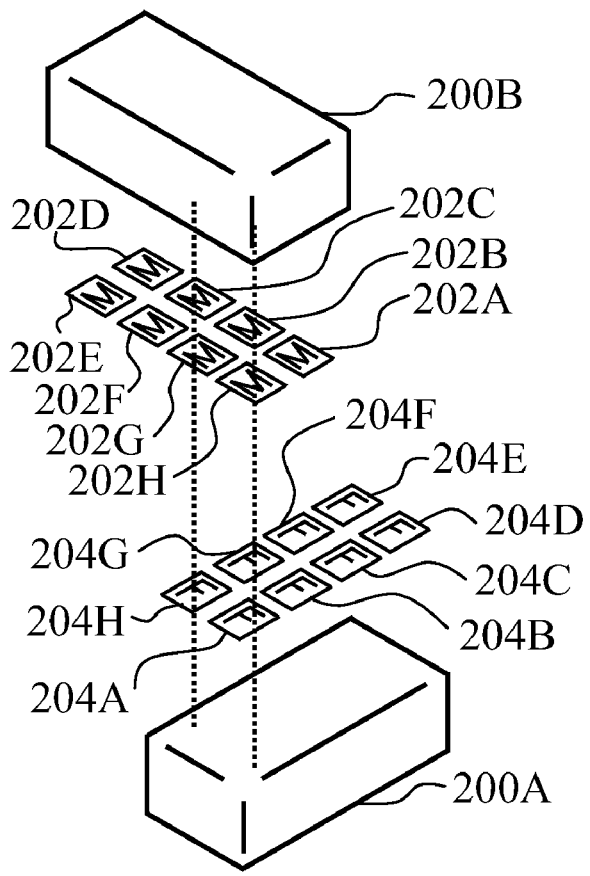
FIGS. 3A and 3B are an isometric exploded view of two blocks as defined in FIGS. 2A and 2B showing connector placement and an assembled view of an exemplary orientation of the blocks.

The embodiments disclosed herein provide a system of physical building blocks having interconnecting elements that provide not only physical connection of the blocks but electrical connection with each other and, through an interface, to a computer or video game device for interaction with a video game. While the embodiments disclosed herein refer to a computer or video game device and a video game hosted on the computer or video game device, any host device may be employed such as a cell phone, web connected personal digital assistant (PDA) or other computing device. Such a host device will generally be referred to herein with the generic term computer or video game device. Similarly, while employed for a "video game" in the present sense of that term, any host application with interaction by the user may employ the invention herein. Such host applications will also be referred to herein with the generic term video game. The electrical connection between the blocks is orientation sensitive with hardware/firmware/software elements contained in the block responsive to the attachment orientation. Varying orientations of the blocks will have alternative effects on the interaction with the video game but may include a virtual representation of the assembled blocks, as will be described subsequently.

Each physical connection point on each block contains a means of electrical (or otherwise informational) connection so that each block can communicate with every block to which it is connected, in most instances through multiple connection points. Each such connection point is as rotationally invariant as the physical connectors themselves. This means that any connector can be placed in contact with its mate in any of the configurations physically possible and still achieve the same electrical and informational connection. Orientation can be determined by the pattern of connection points.

Each informational connection point represents a node in a communication tree which sends (and in some embodiments receives) data to (and/or from) a module or modules associated with the blocks that connect(s) informationally to the video game console. Each of these nodes can either receive (unidirectional) or transceive (bi-directional) data to/from "upstream" nodes and communicate data "downstream" to/from one or several centralized receivers. Data stored in a direct or indirect form (raw, compressed or as a keycode which is used to retrieve data from elsewhere) on the device include a three-dimensional mathematical description of the device itself (including geometrical shape data and aesthetic appearance data), dynamic information such as positional movement of physically mobile parts of the device (e.g. wheels), and other information such as sound and video effects and descriptions of "gaming" capabilities of the device which are communicated to the connected video game.

A communications module in the video game receives the data and provides it to the rest of the control modules in the game to be used to alter the video game. A data packet is built up for each connected node and contains the aforementioned information as well as a description of the relative location of the node within the overall device. Data packets for each branch in the communication tree (each branch representing a series of connected nodes) are appended or otherwise organized or encoded such that the overall structure of interconnected devices can be reconstructed in the video game. Because a single downstream node connection might exist on a block having multiple upstream connections, each node in one direction is capable of transmitting data from all nodes on the same block in the other direction. When more than one downstream node is connected repetitive data is filtered out either in the circuitry of the block or in the video game control modules.

The overall system employing the invention is shown in FIGS. 1A-D as representations of both the virtual world of the video game and the real world associated with the blocks. Using standard game controls 10 appropriate to the type of video game console 12 being used, the user starts playing a video game which is enabled with the features described in this invention. For the exemplary embodiment, the user plays a game of the standard genre in which a game-world character 14 is displayed on the video screen 16 and controlled by the user to move through a game world or a series of worlds or "levels," overcoming obstacles and achieving objectives in order to attain other goals such as a high score or completion of levels or of a whole game.

The user (by proxy via the game-world character) encounters a situation in the game world in which a block structure would be useful. In FIG. 1A, the user has encountered a wall 18 which impedes the user's path (or one such possible path) toward achieving some higher objective. The impedance is such that the user cannot overcome the obstacle without further assistance, and may or may not be an intractable problem; the path blocked by the wall could be the only possible path toward achieving the higher objective, or it could be one of multiple possible paths with possibly a higher desirability than the others based on one or more factors. A different path open to the user might take much longer for the user to navigate, for example, and contain other costs and risks known or unknown.

The user determines or assumes that, while the user might be able to take an alternative path, the path impeded by the wall is a desirable one, so it is desirable to climb over the wall. The user thus starts building a block structure that the user can use to climb over the wall. First the user connects a base block 20 (labeled "RED" in FIG. 1B) to the game console. In the exemplary embodiment, this consists of attaching a cable 22 from the console's USB port to the base block's USB port. In another similar embodiment, the base block contains its own power source such as a battery and the communication connection with the console is via a wireless interface such as Bluetooth.

The "RED" base block status processed by the game controller to which it is attached appears in the virtual world of the game as displayed on the video screen. The user uses game controls to set the block in a reasonably desirable position, orientation and scale (also known as translation, rotation, and scale, or TRS). Such TRS adjustment can be made at any time. Next, the user connects a standard block 24A (labeled "GRN" in FIG. 1C) to the base RED block, offset slightly as shown so that the two blocks taken as an individual structure look like a two-step stairway. Finally, the user connects a second standard block 24B (labeled "BLU" in FIG. 1D) to the GRN standard block, offset in a manner similar to how the GRN block is offset from the RED base block. As shown in FIGS. 1C and 1D, the altered physical structure in the real world with the stacked RED, GRN and BLU blocks is reflected on the video screen in the virtual world as blocks 20', 24A' and 24B'. The user does some final TRS adjustments such that the user can climb the stairway and the stairway has a TRS sufficient to allow the user to climb over the wall.

In this example, for simplicity's sake, the block structure is not built in order to behave successfully under a physics simulation of the real world; built as shown in FIG. 1D, the structure would likely fall over either on its own or as the user climbed upon it. If a physics simulation is applied to a block structure, as will be described subsequently for more complex embodiments, the structure must be built accordingly. As exemplary, in FIG. 1C and D this might mean building a support column into the structure underneath the uppermost (BLU) block using additional standard blocks.

The user climbs the block structure to overcome the wall obstacle, and proceeds onto bountiful game success. But wait! The user meets another obstacle. The user can choose to "store" currently assembled block structures in game memory or game console memory for later use in the virtual world. The user does this, storing the block stairway, as a "tool" in the video game. Then the user dismantles the block stairway in the real-world. If the base block is left connected to the system, it might still appear somewhere in the game world; this can be turned off at user discretion or preference, and turned on again (possibly in a new location with new TRS) when a new block structure is needed. As alternative obstacles are encountered in the game, the user builds a new solution to the new obstacle, repeating the process outlined above but potentially with altered geometric arrangement of the blocks to achieve a desired shape different from the stairway.

Blocks, as defined for the present invention, are able to physically interlock with each other so that more complex structures may be built using the devices as building blocks. The terms "block", "blocks", "device," and "devices" as used in this specification represent any object enabled with at least the minimum capabilities to function in the system. Thus, "blocks" are not limited to the traditional notion of size and shape of a rectangular parallelepiped play piece, or cube or similar shape. A "block" or "enabled object" can take the form of anything such as a plastic molded object of any shape, a doll, a car, a telephone, all in toy form or in real form. The shape must contain the features and capabilities as described herein, such as containing processing and informational connectivity capabilities. As exemplary, toy construction kits can be manufactured that contain "blocks" in the traditional sense of "pieces that connect together to form larger, more interesting, complex structures." Additionally, these kits can be specialized with molds of various sizes and colors and shapes relevant to a specific physical function or to a licensed brand, for example.

The term "block" is used as a representation of inter-connectable units. Some are indivisible pieces from which larger more complex structures and forms can be constructed. Others are manufactured already molded into a complex shape and can also be connected to other simple or complex pieces due to the inter-connectable nature of all pieces.

The "block" technology of this invention can be included in nearly any existing object to enable the object to provide a video game with the object's physical description data and/or interconnectivity and/or any other type of data as an add-on ability. Exemplary additional objects are disclosed in co-pending application Ser. No. 10/981,342 entitled "METHOD AND APPARATUS FOR DYNAMIC ENHANCEMENT OF VIDEO GAMES WITH VENDOR SPECIFIC DATA", filed on Nov. 3, 2004 and having a common inventor with the present application, the disclosure of which is incorporated herein by reference.

Figure 3B:
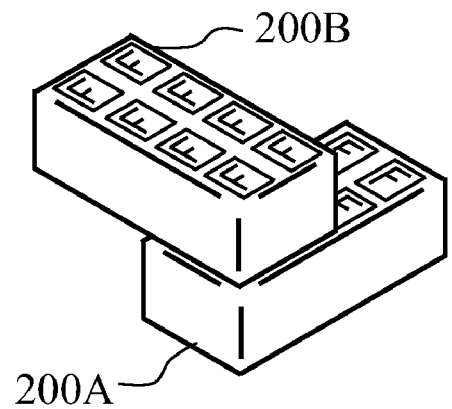

Each block has mating moieties which are joinable to create interlocking structures. In the embodiments disclosed herein, "male" and "female" elements are used as the moieties for ease of description. Each block has one or more locations on it containing the "male" gender of interlocking structure and one or more locations on it containing the "female" gender of interlocking structure. The positioning of each gender of interlocking structure is configured as required for the desired embodiment. As exemplary the embodiments disclosed herein are configured with one gender on top, one gender on bottom to permit repetitive and varied structures to be built. As shown in FIG. 2A and 2B each block 200 has a set of male connectors 202 on a bottom surface and a set of female connectors 204 on a top surface. The "male" and "female" interlocking structure dimensions are standardized across all blocks to allow connection among mating genders on all blocks. As shown in FIG. 3A, orientation of the blocks 200A and 200B and can be varied for connection of varying numbers of mating connectors. FIG. 3B shows that multiple connector pairs mate four males 202A, 202B, 202G and 202H on block 200A top mate with four females 204A, 204B, 204G and 204H on block 200B bottom. The relative orientation of the two blocks is determined by the connector pairs mated.

Figure 4:
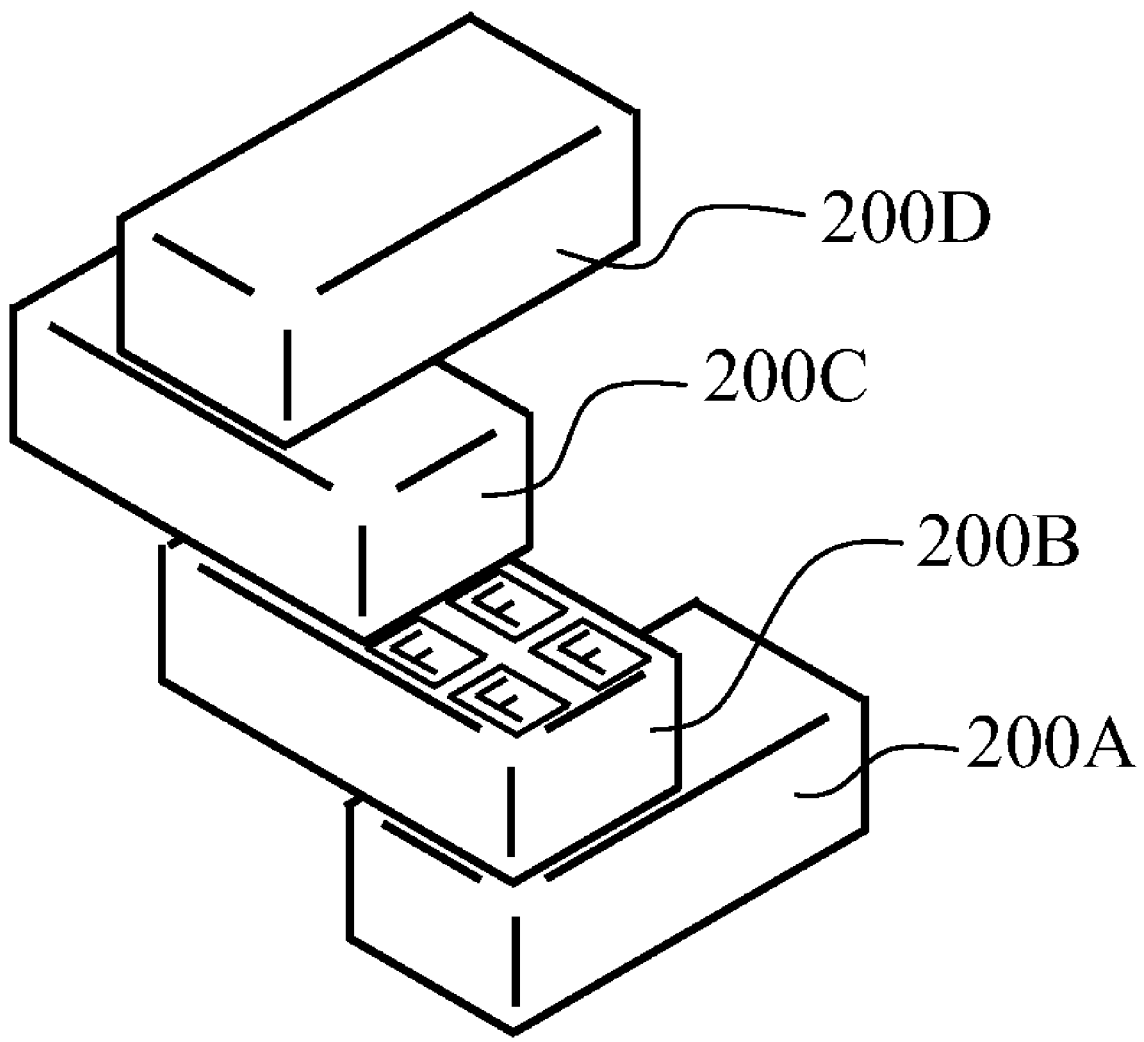
FIG. 4 is an isometric view of an arbitrary structure created using blocks incorporating features of the present invention.
Figure 5A:
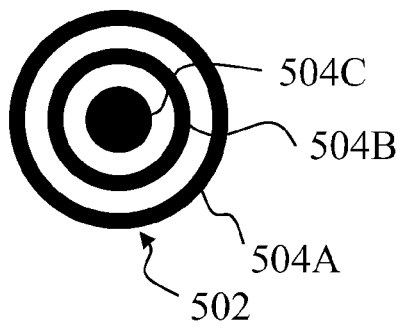
FIGS. 5A-5D are top and side isometric views of an exemplary male and mating female connector for use with the invention.
Figure 5C:
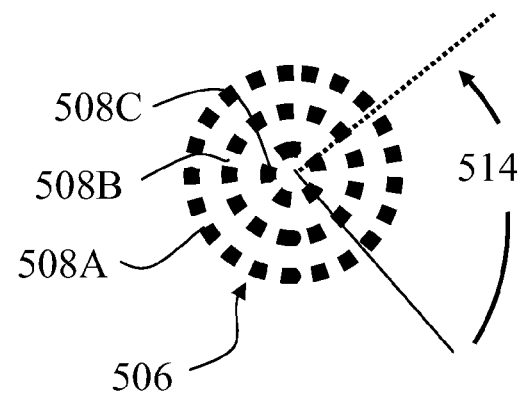
Figure 5B:
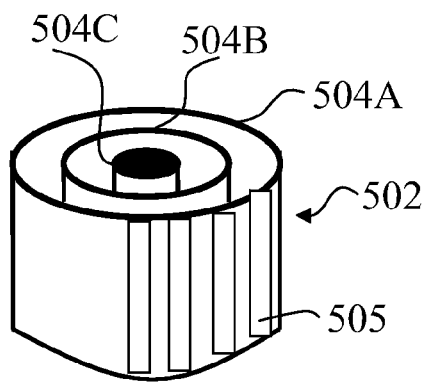
Figure 5D:
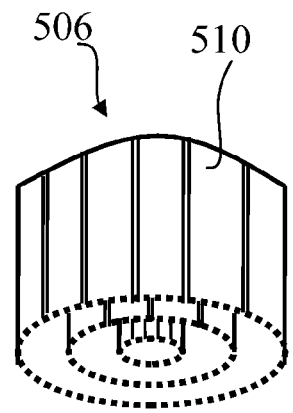

Variations in number, location and type of gender connections as well as in size, shape, color, imprint and mobile components on the devices allows mating to continue indefinitely so that interesting and novel structures can be built. FIG. 4 shows an exemplary assembly of four blocks 200A, 200B, 200C and 200D. Additionally, variations in input and output component capabilities (discussed in detail subsequently) allow for even greater variety and functionality.

All blocks can physically mate to each other. In the embodiment of FIGS. 3A, 3B and 4, mating is via an array or arrays of mating connectors on various surfaces of geometric blocks such that one block can be mated to another in a multiplicity of orientations using one each of multiple possible mating surfaces of each block. As long as a number of connectors remain unmated on a given block, mating can continue indefinitely so that block structures of arbitrary complexity can be created. As shown in FIG. 3B, multiple connectors on each block 202C, D, E and F as well as 204C, D, E and F are "open" and could be mated to additional blocks. In FIG. 4, only one block is mated to each surface of an adjacent block. However, additional blocks could be mounted to the open connectors on each block to extend the structure. Mating can be continued indefinitely in any direction where connectors are located on each block and at any relative block-to-block orientation enabled by the single-axis rotational invariance of the connectors (as will be described in greater detail subsequently) and the physical distribution of the connectors. A comparison of this mating capability is a set of standard LEGO® building blocks.

Depending on the implementation of the connectors there could be a lower limit to the number of connectors requiring connection at the time of mating per block, in order for example to enable determination of blocks' orientation relative to each other.

Mating between blocks is achieved via physical connectors arranged for example in a grid array. To connect the blocks informationally, at least one connector with its associated communications port on each of the mating blocks is connected to its counterpart during each mating of blocks. Communications ports ("comm ports") exist in such number on a given block such that at least one comm port on each of two connected blocks connect in a communicating pair regardless of which physical connectors are used to mate the blocks with the restriction that in any mating pair of connectors, the two connectors can be mated together, for example they are of opposite gender.

Exemplary embodiments herein employ blocks containing a communications port or connection point at each physical connector, and the act of mating the physical connectors also connects the communications ports to create connection paths so that the mating blocks may communicate with each other. Additionally, if it is necessary to transmit power among the blocks, for example from a base block, as previously described, powered by its own battery or else connected to and drawing power from the video game console, the physical connector also contains a complete set of power terminals such that connection with a mating physical connector on a mating block causes the power bus to be shared among the connected blocks. Each such connection point for communications ports and power connections are co-located with and as single-axis-rotationally-invariant as the physical connectors. An exemplary single-axis-rotationally-invariant connector is implemented as a set of concentric cylinders. The connector as a whole is symmetric about one axis orthogonal to the surface of the block on which the connector is located, so that such a connector and its mate could be connected such that the relative angle between the two connectors about that axis can be any value. This means that such a connector can achieve the same electrical and informational connection when it is placed in contact with a mate of its type in any of the configurations physically possible.

In the embodiment shown in FIGS. 5A-5D, the connectors on each gender are implemented as concentric cylinders. A first moiety 502 employs solid cylinders 504A, 504B and 504C with connector pads 505 formed thereon while the mating moiety 506 employs segmented cylinders 508A, 508B and 508C of metal formed with built-in, springy "fingers" 510, having an inner diameter slightly larger than the outer diameter of its mate. Relative to axis 512 through the center of the connector (orthogonal to the page) in FIGS. 5A and 5C, the relative angle 514 between mates of a single mating pair is infinitely variable. Metal tracks are routed from the main circuit to respective metal cylinder: The metal tracks are connected to relevant electrical and informational signals such as HIGH Voltage (POWER), LOW (GROUND) Voltage, Signal IN and Signal OUT. In an optimized embodiment, only one "Signal" circuit is used in the connector and acts as a "half-duplex" communications link, allowing transmission of data in either direction, one-direction at a time. With both data transmission capability and power incorporated into the connector for the blocks individual power within each block is not required for the exemplary embodiment disclosed.

In a similar embodiment, regardless of the number of signal circuits used, each connection point on the top of the block contains a set of concentric metal tracks and each connection point on the bottom of the block contains a set of spring-loaded pins the end of each of which aligns to one of the concentric metal tracks on the top of a mating block.

For the embodiment shown, a standard block is a rectangular parallelepiped with four (4), six (6) or eight (8) "nubbins" protruding from the top and containing the same number of opposite-gender connectors on the bottom capable of mating to that number of "nubbins" from the top of another block. When two similar blocks mate one atop the other with all sides aligned they interlock such that a nubbin on the bottom block is aligned with the corresponding nubbin of the top block. The blocks can also be mated in a similar configuration but with one of the blocks rotated an integer multiple of 90 degrees about an axis perpendicular to the top face of the block, and parallel to the axes of the connectors or offset by some number of connectors as shown in FIG. 4 an previously described. For a given connector the concentric tracks are centered on the axis of connector, thereby making them rotationally invariant.

Two primary functions are provided by the blocks. Blocks communicate with each other and groups of connected blocks communicate with a video game console, for example via a main "base" block. For the exemplary embodiments described herein, there are two types of blocks: "base" block and "standard" block. The "base" block contains all of the functionality of the "standard" block plus the means to communicate with a video game console. For a given operation at least one base block is required.

The "base" block can also optionally contain many of the features described herein as being part of the game features. This has the advantage of off-loading from the game the processing required specifically for this invention, at the hardware expense and software/firmware risk of further enabling the base block to perform these tasks. However, as such hardware as well as processing routines can be made to be field-reconfigurable the software/firmware risk is minimized.

Figure 6:
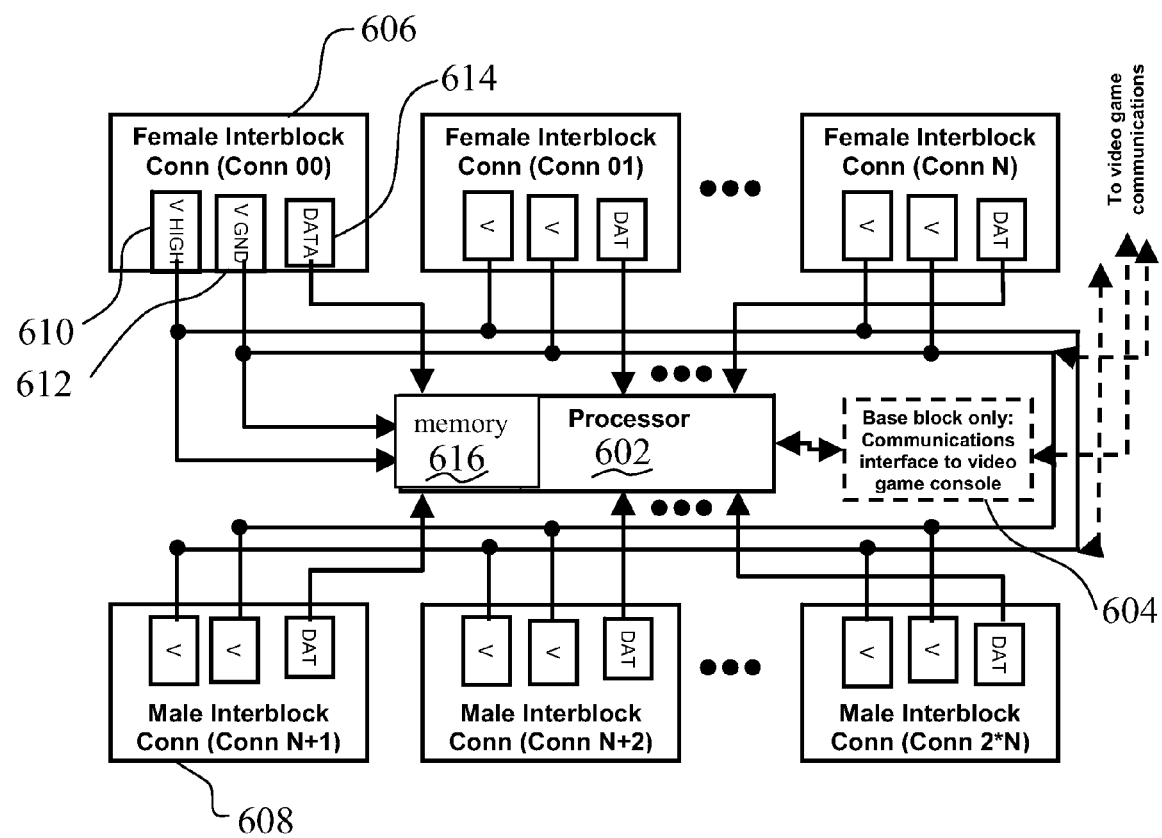
FIG. 6 is a block diagram of the operational elements of the standard and base blocks.

As a detailed embodiment as shown in FIG. 6, all blocks contain a microprocessor 602 such as the Texas Instruments MSP430. Individual MSP430s can communicate with each other using the standard SPI port, but, as there is only one such port per MSP430, their generic I/Os are used for inter-processor communications by programming them with a more customized asynchronous scheme as described in greater detail subsequently. MSP430s can communicate with a video game console via an external communications port such as a SPI-USB port transceiver, for example, the QuickUSB® device 604, which is only required in the base block. Each female connector 606 and each male connector 608 incorporates power connections for V high and V ground, 610, 612 and a data connection 614. A memory 616 is associated with the microprocessor for data storage. In the exemplary embodiment, the memory is persistent, such as Flash memory to allow data to be retained by the block such as the block type and configuration and user history such as highest game state achieved or recent block structures created with this block. A portion of the memory may be active for interactive use in the operation of the system with a portion being read only. The data connection is generalized from the rotationally invariant connectors previously described for interpretation by the processor of block geometric configuration or other data inputs. Electrical power, if needed, is provided in one or more of several possible ways including: from the video game console for example via a universal serial bus (USB) connection; from a powered base unit and transmitted through one or many connection points; via self-contained power storage modules such as a battery contained in each device; wirelessly via RF or microwave power transfer.

In the exemplary embodiment, the power is transmitted from a USB port on the video game console to the base block and from the base block to and through any connected blocks via a VOLTAGE HIGH connector element and a VOLTAGE LOW connector element built into each "all-in-one" connector. Thus in the exemplary embodiment the power bus is propagated from a powered block to an un-powered block with the mating of two blocks using one or more connectors on each block.

Figure 7:
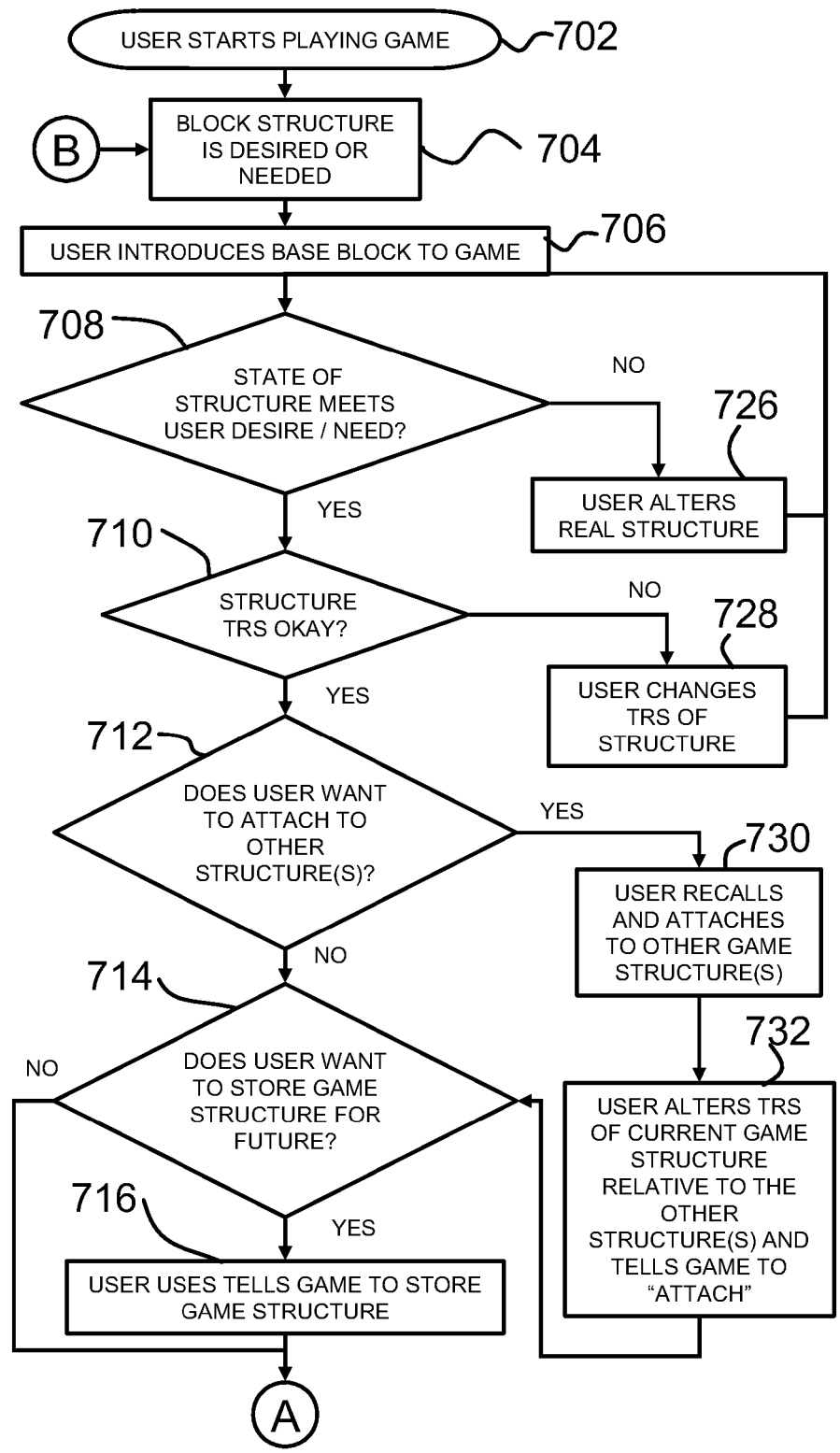
FIGS. 7 and 8 are a flow diagram of an exemplary operation of the present invention.
Figure 8:
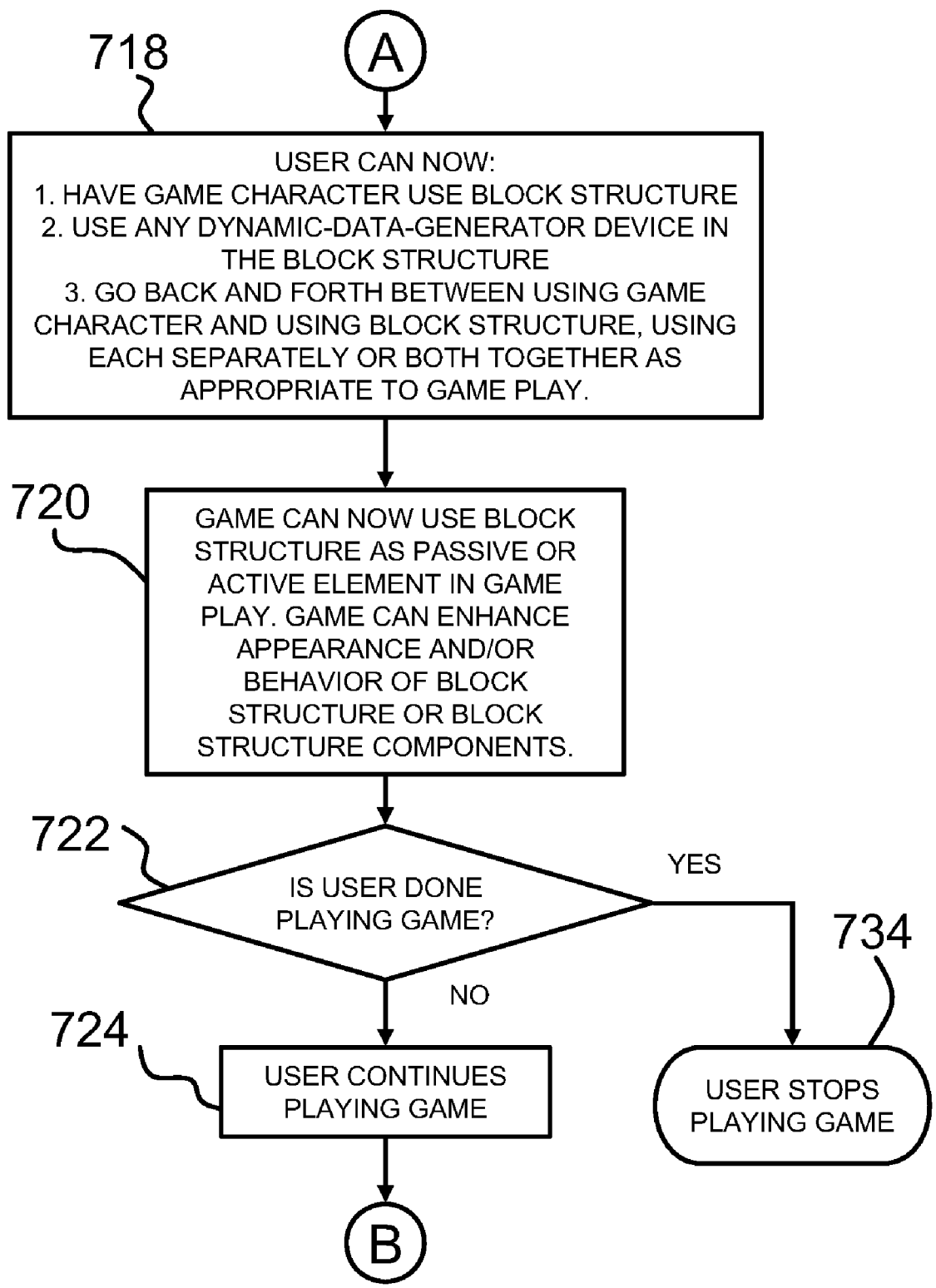

Expanding on the prior example of operation of the invention, a typical usage session is described in FIGS. 7 and 8. As shown in the figures, the user starts playing 702 an invention-enabled video game on a video game console using a standard game input device or multiple such devices. During game play, the user reaches a state 704 in the game where a block structure would help achieve objective(s) or is otherwise desired or needed. The user introduces a base block 706 (possibly with other blocks already attached to it) to the video game console and to the base block's preferred power source if necessary such that the game and the base block can begin communicating with each other.

In the game world, the game draws a representation of the current real-world block structure. The user has the option at any time to add or remove blocks to the real-world block structure. If the current state of the block structure (such as number of blocks used, and the resultant size, shape, or other physical parameters of the structure as a whole) meets the user's desire and/or need in the game world sufficiently 708, then the user proceeds; otherwise the user adds or removes blocks 726 as desired.

The user has the option at any time to change the position, orientation and scale (also known as translation, rotation, scale, or TRS) of the game-world representation of the block structure. If the game representation of the block structure has position and orientation and scale desirable to the user 710, then the user proceeds. If not, then using the standard game controller as well as game routines for this purpose, the user changes the position and/or orientation and/or scale of the block structure in game world 728 as desired.

The user has the option at any time to attach the current block structure to other block structures such as those previously created or otherwise obtained, and recalled into the current game play session. If the user wants to attach the current block structure to such a previously existing block structure or structures 712, then the user uses selection tools in the game program to access and position, orient and scale previously stored block structure(s) 730. Then, as elsewhere, as desired, user changes position, orientation, scale of the current block structure in game world relative to the previously stored block structure(s) and signals the game to execute an "attach" routine 732. A level-of-detail algorithm or algorithms as well as standard game engine visibility test algorithms assist in reducing the amount of data required to draw a general likeness of the overall block structure.

The user has the option at any time to store the current game-world representation of the block structure 714. If the user wishes to do this, the user uses the game program to store the block structure 716. Otherwise, the user proceeds with no further action.

The user can now proceed with any of a number of actions 718 such as having the game character utilize the block structure; using any dynamic-data-generator device in the block structure ; transitioning back and forth between using the game character and using the block structure, or using each or both together as appropriate to game play. Additionally, the game can now use the block structure as a passive or active element in game play 828. The game can enhance the appearance and/or behavior of the block structure or block structure components 720. The user can use the virtual likeness of block structure in the game as a gameplay element such as a representation of the user; a vehicle in which to transport a player; a tool or structure that is used to solve a problem presented to the player in the game such as a stepladder to climb over an obstacle or a bridge to cross a river, and so on.

If the user is done playing the game 722, then the user stops playing the game 734. Otherwise, the user continues playing the game 724, possibly dismantling the real-world block structure in preparation for constructing a new one, and the cycle repeats.

Figure 9:
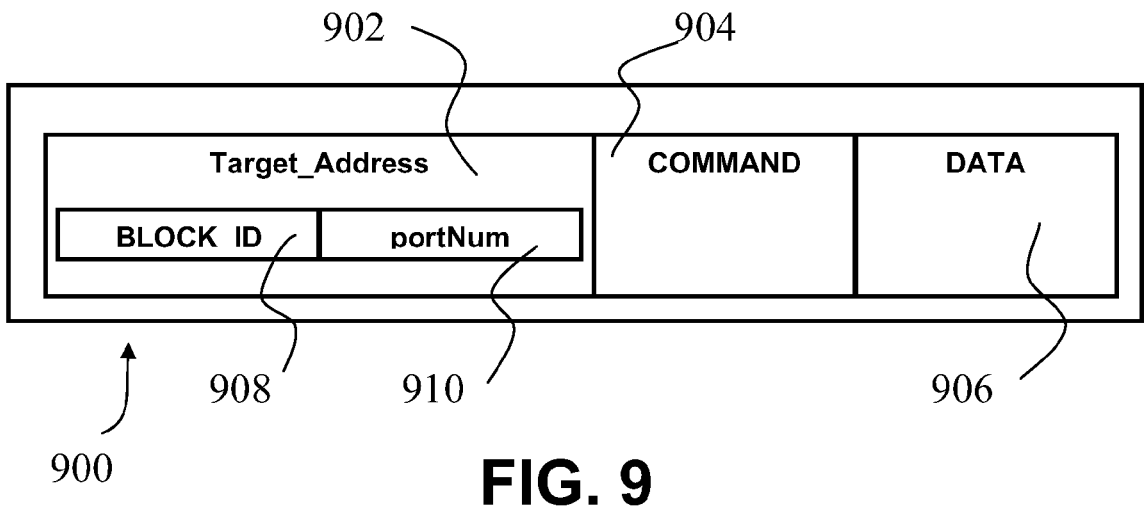
FIG. 9 is an exemplary command format for data communication by the blocks of the present invention.
Figure 10:
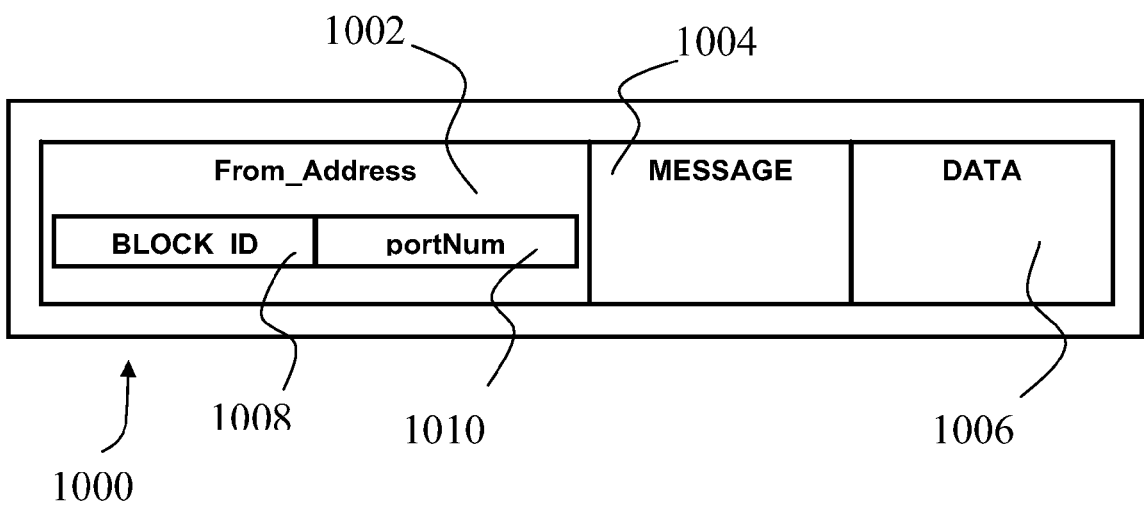
FIG. 10 is an exemplary response format for data communication by the blocks of the present invention.

For the exemplary embodiment, communications between blocks and the video game controller is established and maintained using a command and response structure as shown in FIGS. 9 and 10. A COMMAND word 900 in the preferred embodiment consists of a "Target_Address" 902, a "Command" portion 904 and a "Data" portion 906. The Target_Address further consists of a "BLOCK_ID" 908 and "PORTNUM" 910. Each portion of the command word is used or not used depending on the function being performed. For example, if the game wishes to send a command to a specific block's port such as, "See if anything is connected to you", then the BLOCK_ID and PORTNUM portions of the Target_Address are both used, as is the "Command" portion, and the "Data" portion might contain a new "BLOCK_ID" to be assigned to the new block if one is connected at the PORTNUM specified.

The structure of the RESPONSE word 1000 is identical to that of the COMMAND word, except the naming of the fields, with a From Address 1002, message portion 1004 and data portion 1006. As in the command word, the From Address incorporates a block ID 1008 and a PORTNUM 1010. Some features might require multi-word RESPONSE messages because a response might not fit into the pre-defined RESPONSE word length. In this case, the response is broken up into a number of smaller pieces. The original response sent as an answer to an incoming command tells the requester that the full response requires a multi-word transfer. Information provided in such a response can include the number of RESPONSE words of the pre-defined length the data requires for transmission. The receipt of such a response causes the requestor to initiate a pre-specified multi-word transfer routine, which the responder knows how to negotiate. Such transfers might include handshaking, data compression, error correction and the like as necessary.

Exemplary commands for the system functions, some of which will be described in greater detail subsequently, are shown in Table 1.

TABLE 1

Core command #1
   Connectivity query:
      "If this block does not already have an address, take the address provided in the data section
of this command message and assign it as this block's address for communications addressing
purposes. In the RESPONSE word, provide information sufficient to draw a likeness of this
block in the game, along with information describing connectivity to blocks connected directly to
this block."

TABLE 1-continued

Physical description information can be provided either directly or via keycode which game can use to look up such drawing information. Connectivity information can be as described elsewhere in this document in the entry addressing that subject.

Core command #2
    Routing map reset: "Reset your routing map." The routing map concept is described elsewhere in this document.

Other command #1
    Dynamic data query: "Provide the most current sample of all dynamic data that this block supplies." (A similar command can specify that the block provide only a particular portion of the block's dynamic data.)

Other command #2
    Multi-word transmission control: "Give me the next word in the multi-word message you are currently sending." Additionally or alternatively, an identification code can be provided instructing the responder to send a specific piece of the message. This is useful for error correction.

Other command #3
    Sensor output: "Take the data provided in this (possibly long, multi-word) message, and send it to your output device which has the designator provided."

Other command #6
    Field configurability/block reprogramming: "Take the data provided in this (possibly long, multi-word) message, and use it to re-program the chunk of your non-volatile memory pointed to by the address provided in the first part of the message." Other commands not shown accompany this command to facilitate multi-word programming cycles in order to ensure error-free, complete, efficient transfer of new content datastreams.

Similarly, Responses are shown in Table 2.

TABLE 2

Core Response #1
    Response to "Connectivity query" command:
    "SUCCESS": This block has retrieved a new BLOCK_ID from the COMMAND word and has assigned it as this block's BLOCK_ID. The block's BLOCK_ID plus the port designator (PORTNUM) on which this communication is taking place is stored in this RESPONSE word's FROM_ADDRESS field. Also, the "physical likeness data" that can be used directly or indirectly to draw the block's physical likeness in the game is stored in the RESPONSE word's DATA field.

Core Response #2
    Response to "Connectivity query" command:
"SUCCESS, WITH QUALIFICATION": This block has received the command properly and observed the new block address in the COMMAND word but this block already possessed a valid block address. For verification purposes, the block's (previously existing) address, PORTNUM (and, optionally, "physical likeness data" or keycode to same) are provided in the RESPONSE word's various fields.

Core Response #3
    Response to "Connectivity query" command:
    "FAILURE: No block found at port given in Target_address."

Core Response #4
    Response to any command:
    "FAILURE: BLOCK_ID given in TARGET_ADDRESS of COMMAND is not found at this block or in this block's routing map." (See "Routing map" topic for further information.)

Response #5
    Response to "Routing map reset" command: A response to a routing map reset command is not necessarily needed, but for completeness two possibilities are shown here:
    "SUCCESS: Reset routing map" or "FAILURE: problem resetting map." In the case of the failure, diagnostic information could be included in the "message" or "data" portion of the response.

Response #6
    Response to "Dynamic data query" command: "Part of the 'message' portion of this response indicates that this is a 'start token', the beginning of a set of response words of a length described by the number provided in part of the 'data' section of this response. That number of response words will be sent now, followed by an 'end token'.
    The other part of the 'message' portion of this response additionally or alternatively contains an identification code indicating the position or section or order where this piece of data belongs in the larger, complete response. This is useful for error correction.
    The other part of the 'data' section describes the component on this block from which the dynamic data comes."

Response #7
    Response to "Multi-word transmission control" command:
    "Here is the next word in the message."
    The response additionally or alternatively contains an identification code indicating the position or section or order where this piece of data belongs in the larger, complete response. This is useful for error correction.

TABLE 2-continued

Response #8
  Response to "Sensor output" command:
  "SUCCESS" or "FAILURE to deliver." Additionally or alternatively the responder could proceed with a multi-word transaction if that is the intent of the requestor.
Response #9
  Response to "Field configurability/block reprogramming" command: Various "SUCCESS," "FAILURE," "CONTINUE" codes.
  As discussed in the command counterpart to this response, other commands accompany this command to facilitate multi-word programming cycles in order to ensure error-free, complete, efficient transfer of new content datastreams. Thus, other responses not shown accompany those commands.

Though it is not necessary to the basic functionality of the invention, blocks can be made to be field-configurable so that their functionality and/or stored data can be added to or updated in the field (e.g. in the user's home) after the time of manufacture. During such a field-reconfiguration, the block content such as the block's program and/or data can be added to or changed in the block. Data that might be added to existing block data include user identity data and preferences; a record of user achievements and experience; a record of larger block structure identity codes that this block has been a part of in the past; locale; versioning information, and the like.

Capability for such configurability can be accomplished using Flash EEPROM-based microprocessors such as the Texas Instruments MSP430F12321PW which contains (8 KB+256B) Flash Memory and 256B RAM. The Flash Memory is user-programmable, storing program and other data.

Update of block functionality can be at the discretion of the user and/or under the advisement of the game/game console. The game/console can communicate periodically with a central website, for example, to remain informed when upgrades to the block's "firmware" (the intellectual property resident in the microprocessor comprising its functionality) become available.

Alternatively, for example if the game console is not connected to a network, game program "update" shipments such as a compact disc ("CD") or digital-versatile-disc or digital-video-disc ("DVD") can be obtained by or provided to the user to deliver the updated program and/or data.

On the console side, the means of installing the new block program and/or data (for example, a program that runs on the console) can be delivered with the new content or be shipped with the game. On the block side, the block's core functionality includes the means to perform the update. In the preferred embodiment, this is implemented as a separate programming module inside the block which re-programs portions of the non-volatile memory. The core capabilities needed by the block for reprogramming remain functional during reprogramming.

Reprogramming even the core capabilities is also possible. For example, if as in the exemplary embodiment a microprocessor is used, the "core capabilities section" of the processing program is pointed to by a "boot vector" which enables the microprocessor upon power-up to retrieve from a permanent, unalterable address (also called a "reset vector") a piece of data representing the starting address of said programming section. The processor then jumps to that address as the starting point of the processing program. By changing the starting address stored in the reset vector and also storing the new "core capabilities" programming at this address, the core capabilities can be reprogrammed. The new core capabilities take effect on next power-up of the block.

The data stored in and/or generated by the blocks and sent to the game can be rich in content. There are many ways the video game can use this data received from a block or set of blocks. For example, an existing game can read the information and use the constructed structure as a representation of the player. The block structure could be used as a vehicle for the player or it could be used as a tool the player uses to solve a problem in the game (for example, the obstacle previously described which must be climbed with the blocks built for a set of stairs to achieve this goal.) Each such use can be further enhanced by animation and effects data provided by the block generated in various ways such as at time of manufacture or under user control of dynamic components built into specialized blocks.

Static data for the block and its components is that which does not change with time. An example is the physical description of what a block looks like. Slow-changing data can also be classified as "static" inasmuch that it does not change over a given time interval (for example, over an interval of several tens of seconds) such as the connectivity information describing how a group of blocks are connected, located and oriented relative to each other and to each communication node.

This static data can be separated from any dynamic data which could change over time such as that for block elements with moving parts, the state of which can be changed by the user. Dynamic data includes for example the rotational position of a set of wheels that are part of a specially capable block, or an indication that the wheels have rotated by a certain angle (e.g. one angular degree) in one or the other direction. The dataset provided by or pointed to by the block can contain information suggesting sample rate(s) for the dynamic data.

This data separation reduces communication time during both the static and dynamic interaction of the user with the blocks. During the static phase, for example when a block is first connected into the system, only static data (or a keycode representation) is provided to the video game. If keycodes are not used and the physical description data is provided in full from the block then it is typically the bulk of the data provided from the block. This is because, for example for a block manufactured as a solid color, the physical description data contains a significant number of points in three-dimensional space along with color information representing the physical appearance of the block. For the exemplary embodiment, however, keycodes are used, so that other data types contain more data.

Additional static data can include more detailed color and texture information and shading and lighting models such as are used in standard video game rendering engines. Another type of static data is that which describes the dynamic data elements available on a given block. For example, the block can indicate to the game that it possesses a wheel sensor, and the block can also provide the game with a recommended sample frequency with which to query the block for its wheel sensor data.

Much of this static data can be reduced by using keycodes in place of actual data. Keycodes can be used retrieve versions of actual data stored beforehand in the video game itself in a database that is accessed over a network. For example, a kit consisting of a video game and block collection can be sold as a unit. The video game therefore can include at time of production the appearance of all the blocks included in the collection. Alternatively the game can provide the keycode(s) to a central website to retrieve the full dataset(s).

An alternative embodiment removes the restriction that the game know all the possible data or be able to retrieve it over a network: The blocks can contain all the data that the game needs. The limitation involving this embodiment is cost of embedding more data storage in the blocks and the amount of time required to transmit the data from the block to the game.

During the dynamic phase, for example after a block is connected into the system and the user has begun to interact with the block and/or the present collection of connected blocks, only dynamic data needs to be sent. It can be sent every frame or only as it changes. The game can determine, with assistance from data sent during the static phase as just described, an appropriate sample frequency to query a block for either all or just a subset of its available dynamic data.

For example, if a block contains a wheel sensor and during the static data transmission phase indicates to the game that the sensor data should be sampled at least twenty times per second, the game can schedule such a query cycle. During such a cycle, the game builds a COMMAND word targeted to that block requesting the dynamic data for the wheel sensor. The block responds by sampling the wheel sensor, constructing a RESPONSE word with the resultant data and sending it back to the game.

As mentioned, blocks might have dynamic data-generation capability as well as static. Examples of use of this type of data will be described in greater detail with respect to FIGS. 18-20.

Dynamic data can describe a dynamically-changing state of the device such as whether a pushbutton on the device is pressed or not, the position of a rotary sensor, and so on. Other examples of dynamic data include a sampled soundwave coming from a microphone attached to or built into the device, or image data coming from a camera on the device, or positional information derived from motion sensors built into the device.

Dynamic data coming into the video game can be used to further alter the state of the video game. For example, a pushbutton on a block can be used as a trigger for turning on a light in the game or activating a tool in the game. Information (such as other physical description, animation, sounds, images, etc) describing and/or controlling the behavior of such an action can be specified in a number of ways such as retrieved from the "block" (in either a direct or indirect (keycode) fashion) or via a functional mapping dictated by the user or dictated by a central mapping service resident in the game or on a central server accessed over a network.

More examples of dynamic data generators and their game use include rotary sensors attached to wheel axles on a block can be used to turn the block's wheels in the game, thereby allowing the user to move the game world block structure around in the game world by moving the real world structure around in the real world; sound data coming from a microphone mounted on a block can be sent to other players' games in a networked game; image data from the camera can be used to display a player's face in the game world.

Additionally, static and dynamic data can be sent from the console to a given block. Outgoing dynamic data can be used to alter the state of the blocks in the physical world. For example, a physical light on a block can be turned on. A speaker can be driven with sound data to make noise or other sounds. A display can be driven with a picture or a series of pictures. A combinational use of a speaker, camera and image display unit might be used as a "video telephone" to communicate with other real-world players or with game characters Example "incoming" data generators are components which generate data that "comes in" to the video game from a block and include switches; rotary knobs (with directional and/or absolute rotary encoder sensors attached); joysticks; keypads and keyboards; wheels (with one of the rotary type sensors just mentioned); camera; microphone; RFID tags with RFID reader attached to the video game console; motion sensors; universal product code (UPC) scanner; magnetic card reader; pressure sensor; light sensor; temperature sensors; and other sensing equipment.

In each case, the block housing incorporating the input device also incorporates the circuitry required, if any, to drive the input device and convert input information into data that can be inserted into a (possibly multi-word) RESPONSE to a request command from the video game for the block's dynamic data, With sensors included as a portion of blocks users can build their own game controllers, for example. The game can send and a block can receive data for uses other than as a COMMAND word intended to access data or other information on the block.

Example "outgoing" data displayers are components which can utilize data that "comes out" of video game to a block. Such data is in general generated by the video game, although it could come from other sources such as an external storage device or external network or game console peripheral hardware component such as an external camera. Lights; display (e.g. liquid-crystal display or LCD); speaker; speaker driver with headphone jacks; music player; motors; other actuators. Drive circuitry (if any) for such "outgoing" data display is built into the block that contains the display(s).

Power for active elements in the blocks is obtained from the same power circuit which drives the block's processing circuitry. In the exemplary embodiment, the power bus is common to all blocks and transmitted among blocks via the connectors which contain physical connection plus informational connection plus power connection as previously described.

Limitation on power usage is a function of several parameters including the current-carrying capacity of the connectors, the number of connectors acting in parallel and/or the number acting in serial in a given branch of the tree-type structure as will be described with respect to FIG. 12 the power draw of a given branch (and given sub-sections of a branch), the power source, and so on.

In the exemplary embodiment, overall power usage is controlled in the base block and the current-carrying capacity of the connectors is rated at several-to-many times the current expected at the maximum power allowed by the control circuitry in the base block, so that even if one connector carries all of the power allowed by the base block control circuitry the connector will not fail.

In addition to static and dynamic data, blocks may have "extra" data related or unrelated to physical "real-world" representation and exclusive to "virtual-world" representation. Any type of dataset can be provided by a block, either as static or dynamic data, to be used as static or dynamic data. A typical example is a set of data representing a visual and audio effect to be displayed by the game when a certain action is undertaken by the user such as pressing a button on a button-enabled block.

Examples of unrelated data include sound to be played when a certain game event occurs, either related to block state or game state or not such as a squeaky metal axle sound to be played when a pivoting component of block is rotated. A second example is animation cycle including all geometry, shading information, animation information. Such additional data can specify whether such geometry becomes part of the game world ready for interaction. For example, a block's physical likeness is manufactured to resemble a cylinder and that block contains a switch mechanism such as a pushbutton which when activated tells the game to run that block's animation cycle. The animation cycle, uploaded to the game console as part of the block's "static data to be used dynamically" is that of a flaming exhaust stream being ejected from one end of the cylinder-shaped part of the block. Additional data for this example could include physical simulation information to allow the block to act as a "jet-thruster" to propel the block (and the block structure to which it is attached) through the game world. A third example is an image to be pasted (like a decal) onto surface in game under user control. For example, the image could be of the user captured from camera embedded in a specialized block, or the image could be one that user created using a separate software program. The same block could contain a pushbutton to control when the "paste" of the image is to occur.

Usage of unrelated data in the game can be specified in data included in the dataset, or via a functional mapping dictated by the user or dictated by a central mapping service resident in the game or on a central server accessed over a network. Such mapping information can be interpreted as default information which can then be overridden in various ways.

Mapping is more than just connecting the commencement of an action to another action. It is used to indicate mapping of one behavior to another. For example, as the classic "trigger" definition, it could mean a pushbutton activation causing the "one-shot" playback of a sound. But the mapping could be more complex such as "when the real-world rotary component on this block changes in the clockwise direction, increase the audio volume of a certain aural component in the game by a certain percentage." Mapping may be accomplished by data-bound field(s) or by user specification.

For example, if a block contains a pushbutton the block can also provide data representing a sound to be played by the game when the pushbutton is pressed. A "mapping" field or fields in the sound dataset can include the identification code of the block's pushbutton component. This represents a mapping of the pushbutton "trigger" to a behavior that the game can understand and implement.

For user specification, dynamic menu-sets in the game can allow the user to specify how such datasets get mapped. The drivers in such maps can come from various sources such as features available on all blocks in the same block structure or on features available in the standard game controller or in the game itself.

Figure 11:
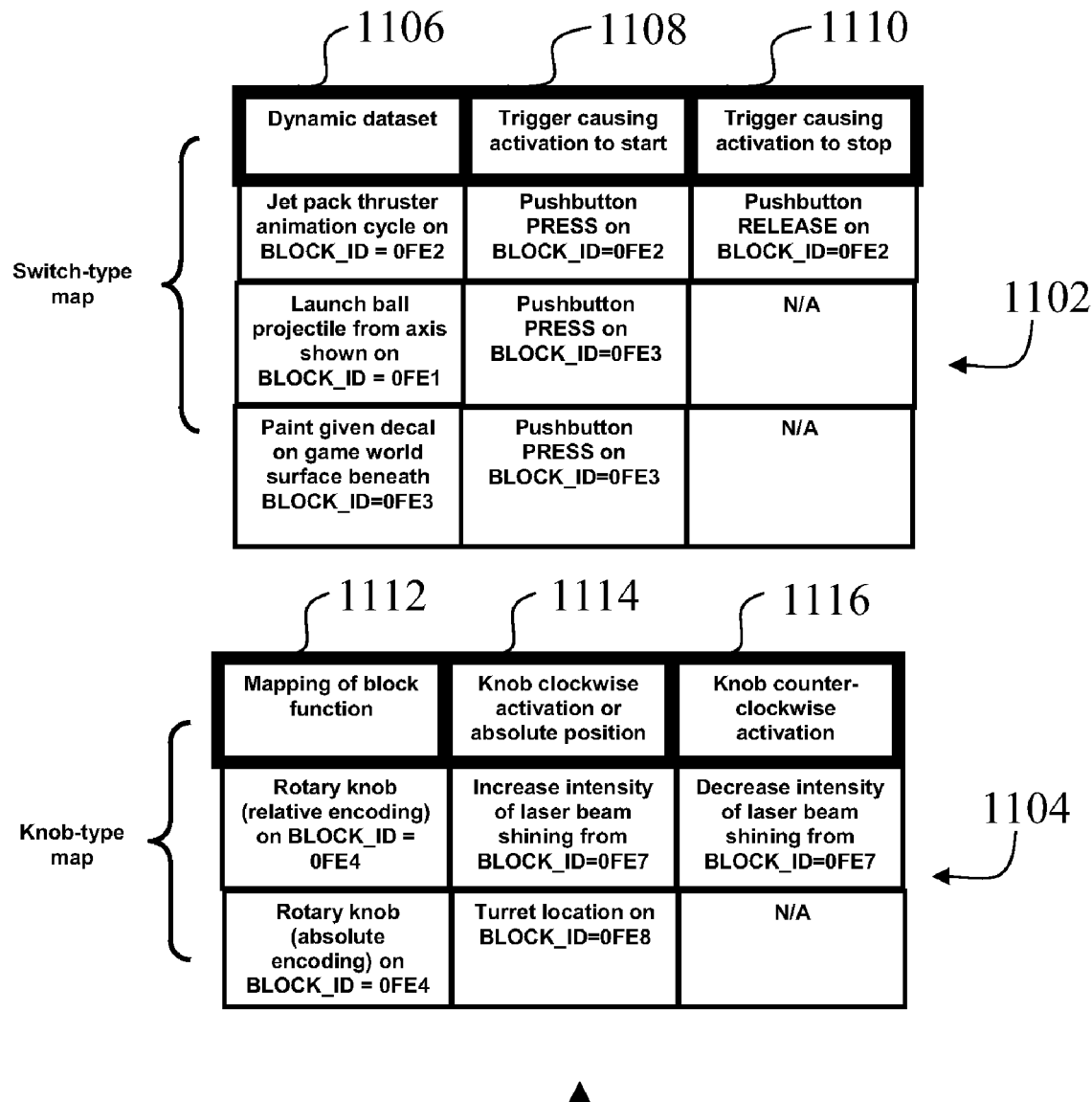
FIG. 11 is an exemplary format for mapping of functional elements of a block for communication with a video game.

FIG. 11 shows example dynamic menu-sets in the game which can allow the user to specify how animation cycles, for example, are triggered based on features available on all blocks in the same block structure. This could be simple mapping of pushbuttons to available animation cycles, for example. A driver on one block can be mapped to the behavior or usage of a dataset on a separate block. FIG. 11 demonstrates both a switch-type map 1102 and a knob-type map 1104. The switch type map includes definition of a dynamic dataset 1106, the associated trigger causing activation to start 1108 and the associated trigger causing action to stop 1110. Similarly, the knob-type map includes a mapping of block function 1112 with the associated clockwise or absolute position interpretation 1114 and the associated counterclockwise activation 1116

Various map types exist to allow appropriate mappings for the various types of inputs and outputs. The mapping allows but the figure does not include drivers from standard game sources such as, "Button A on game controller is pressed," "When game character is made to jump," etc.

In the exemplary embodiment, the base block communicates with the game console using a protocol such as the SPI protocol via a QuickUSB® device connected to the console's USB port. Standard blocks communicate with each other and with the base block using a single-bit asynchronous "Leader-Follower" arrangement.

Figure 12:
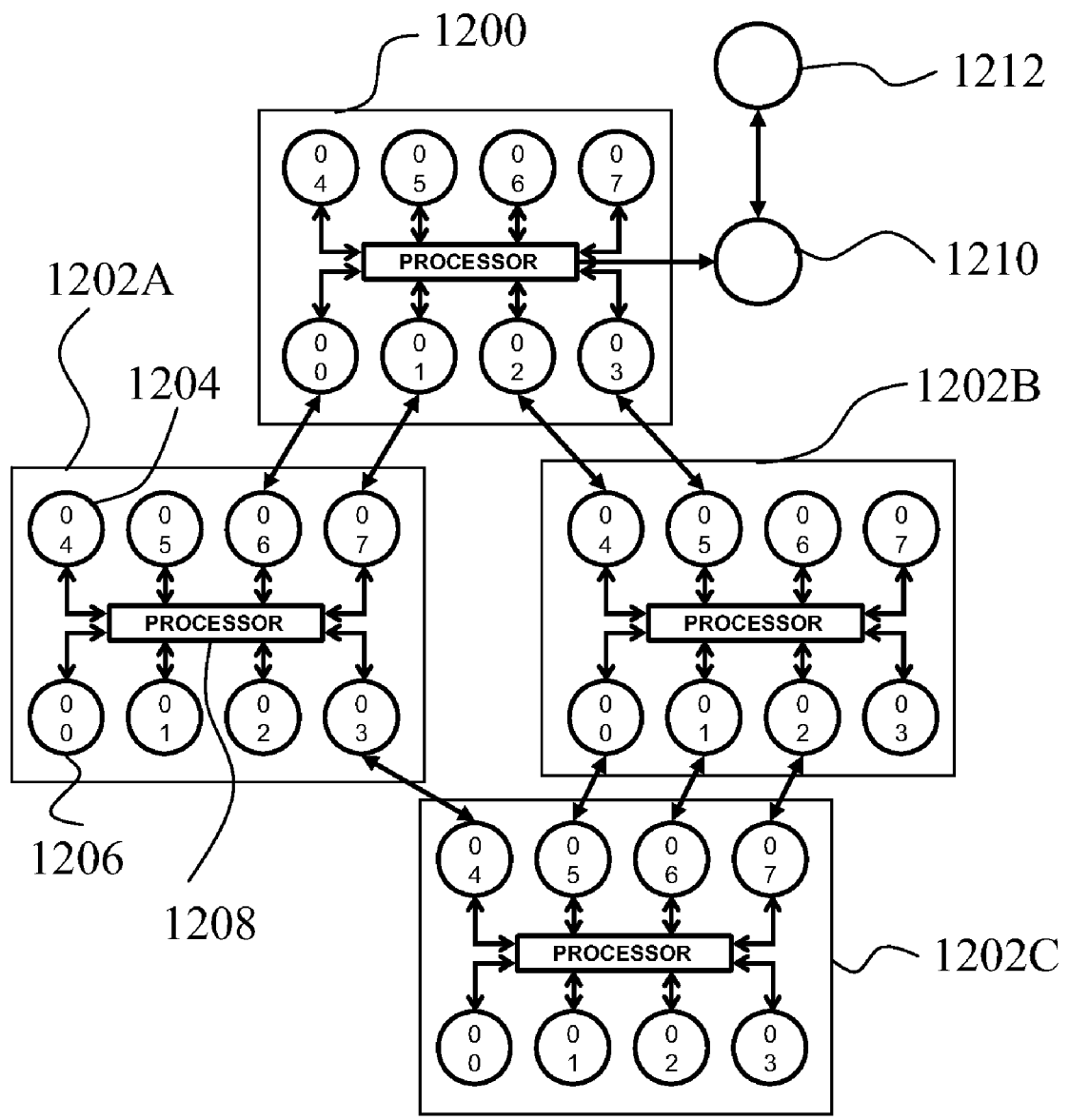
FIG. 12 is a functional block diagram showing connection of a base block with standard blocks.

As previously described, each block incorporates of a number of interblock communications ports ("comm ports.") As shown in FIG. 12 for a block set with a base block 1200 and three standard blocks 1202A, 1202B and 1202C each having four connectors 1204 on the upper surface and four connectors 1206 on the lower surface, the processor 1208 on a given block has access to all comm ports on the block and can route information from any comm port on the block to any other comm port on the block.

The base block has an additional comm port 1210 to communicate with the game. The game's comm port 1212 is the root of a tree-type structure which changes as blocks are added to or removed from the block structure. The base block's game comm port connects to the game's comm port. All other blocks connect to either the base block's interblock comm ports or to other block's interblock comm ports. In alternative embodiments, centralizing block communications into a single base block can be replaced with other schemes, such as having multiple such communications centers in a given block structure or enabling all blocks with communications capabilities.

Along with block physical data provided by the block describing the physical location on the block of each of the block's comm ports, the connectivity that this tree-type structure represents enables the game to draw a likeness of a block structure comprising a multitude of individual connected blocks. Re-construction of this tree-type structure by the game is the main purpose of the game sending commands to the blocks and processing the resultant replies. Additionally, a unique address for is defined for each block, existing on the block due to one or more of several possible operations such as insertion at time of manufacture and/or assigned under game control some time after a block is inserted into the system, allowing for routing of communications from the game to a specific block, through a path consisting of possibly multiple blocks. Each block, including the base block, maintains a routing map for itself describing which blocks are reachable from each comm port on the block as discussed in greater detail subsequently.

In other embodiments, the protocol might be different for different directions of communication (e.g. between base and console versus between console and base.) Additionally, blocks of any type might communicate with the console in one or both directions. For example, if each block contains an RFID tag, then the game could send a command directly to any block and receive a response directly from that block via an RFID reader.

Each block contains processing routine(s) that can process COMMAND and RESPONSE words and generate dynamically and store a routing map describing the blocks that can be communicated with from each of the block's communications ports. FIG. 13 shows what a routing map might look like during a typical session.

In following description, "downstream" is defined as "closer to the video game console" and "upstream" is defined as "farther away from the video game console." As described with respect to FIGS. 9 and 10 messages contain an address field showing the address of the block for which the message is intended or from where the message originated (as messages can travel in either direction, upstream or downstream from the video game console.) The block contains pre-programmed routines for processing messages received by the communications ports by viewing the contents of the message and taking appropriate action. These actions are described in FIGS. 14 and 15 which show block actions during a communications transaction when the block communications ports are implemented as a single data connection (e.g. a single pin) operating in half-duplex mode. To execute the communications transaction, one block operates as "leader" and one as "follower". The leader initiates and controls the transaction using a protocol known to both the leader and the follower.

Typically the game program initiates a command sequence by sending to the base block a command addressed to some block in the system. Based on the BLOCK_ID given in the command's TARGET_ADDRESS as well as with the assistance of the routing map stored in the base block, the base block determines on which of its communications ports (if any) to route the command. If such a port is found, the base block assumes the role of "leader" and initiates a communications transaction. If no such port is found, the block informs the game as such.

All blocks in the system remain in "follower" mode most of the time as described next, assuming "leader" mode only after a known sequence of events. Typically, when a command is being sent "outbound" from the game console, from downstream blocks to upstream blocks, the downstream block in a given communicating block pair assumes the role of "leader" in the communications transaction between the blocks. When a response to the command is being sent "inbound" to the game console from upstream to downstream, the roles are reversed and the upstream block in a given communicating block pair assumes the role of "leader" in the communications transaction between the blocks.

Thus, leader/follower roles are assumed in a deterministic way, rippling outward from the game console and back during any given command/response sequence.

Figure 14:
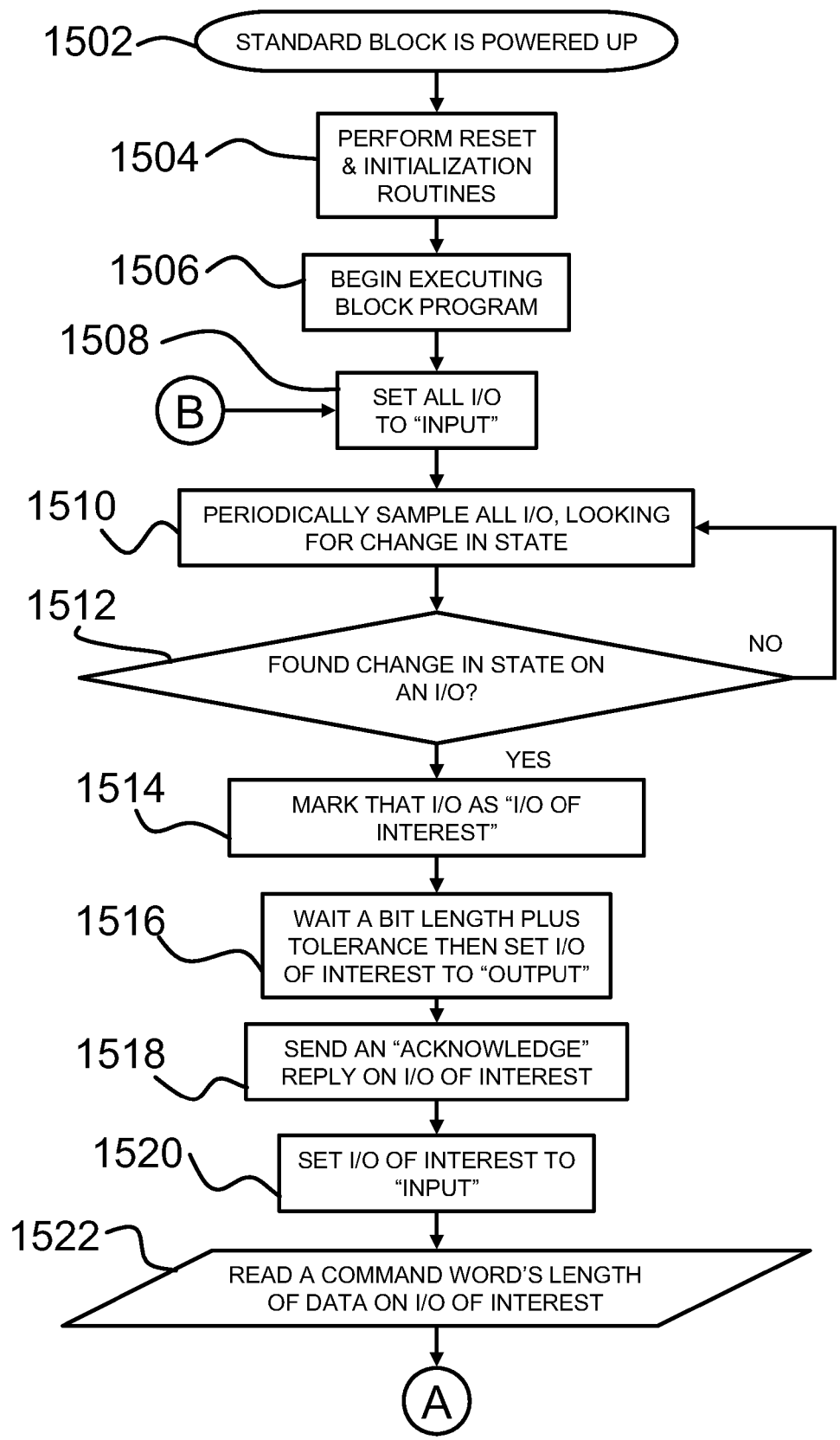
FIGS. 14 and 15 are a flowchart of exemplary communications between blocks in the present invention.
Figure 15:
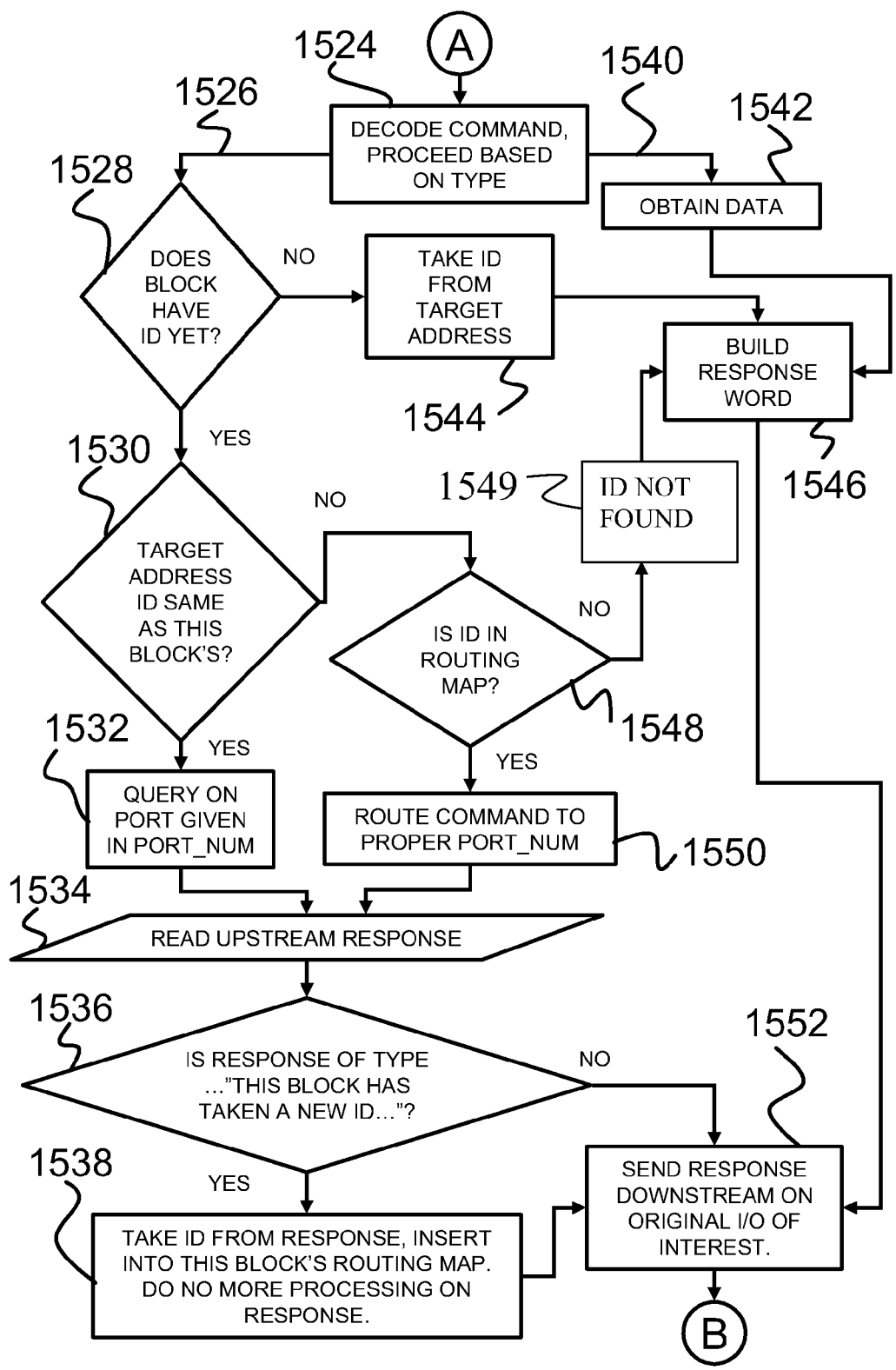

FIGS. 14 and 15 show the block operation when the block operates as "follower" in the transaction. "Leader" operation follows similar logic, as described here.

When a standard block is powered up 1502, for example by connecting it to a powered base block or a standard block already part of a block structure, the block performs its reset routine 1504 and begins executing its block program 1506.

The block program sets all of the block's I/O to "input" mode 1508 as part of the initialization routine. Then all I/Os are sampled periodically 1510, looking for a change in state (for example from LOW voltage to HIGH) on any I/O. If no change of state is found 1512, no action is taken.

When the leader wishes to initiate communications with a connected block, it will first send a "communications request" ("CRQ") on an I/O and then change the I/O to "input" mode to wait for a reply. In a single-data-bit, half-duplex system such as is being described here, typically this CRQ is implemented by a single data-bit-length asserted bit of data. For example, the leader sends a HIGH voltage pulse for an amount of time equal to a bit length. To do this, the leader changes its I/O to be "output" and drives the output to a HIGH voltage.

The sampling proceeds at a rate significantly higher than the predefined bit rate such that detection of a state change is made relatively close to the actual time of the change. This acts as a reasonable "synchronization" between leader and follower and reduces the uncertainty their respective bit stream timings. Each CRQ/ACK pair essentially acts as such a synchronizer, which is useful for overcoming message-length limitations imposed by timing differences among blocks due to circuit and device variations; messages can be broken into pieces small enough to be sent successfully even accounting for timing differences, and a "resynch" executed after each piece.

When a given I/O is not designated as an "output", and nothing is connected to it, circuitry (e.g. a "pulldown" resistor) causes the I/O to remain in a known state (e.g. LOW voltage.) When a pair of connectors are connected to each other, one each on two separate, mating blocks, it is important that at maximum one of the blocks at a time drives the common data circuit (connected to one I/O on each block) to a given level. This is so that interference (i.e. bus contention) is avoided.

As mentioned previously, this "half-duplex" requirement is achieved by designating one connector the "leader" and one the "follower". The follower keeps its I/O in "input" mode most of the time, only switching to "output" mode after reading one of a multitude of known patterns on the input. The leader controls the communications transaction by controlling the pattern on the connection, thereby controlling the behavior of the follower.

If a change of state is found by the follower on any I/O, then that I/O is marked as an "I/O of interest" 1514. The block then waits 1516 at least as long as the nominal length of a data bit plus timing tolerance as prescribed by the communications protocol. The wait allows enough time for the "leader" to change the state of the data bit back from an asserted state to a de-asserted state. This is important so that, as just described, no interference occurs by the leader and the follower both trying to drive the connection at the same time.

The I/O can be sampled again at this time to ensure that the connection has returned to a de-asserted state, for example. For less robust applications, this sampling can be skipped, and the processing continued as follows:

The "I/O of interest" in the follower is set to "output" mode, and an "acknowledge" ("ACK") reply is sent by the follower 1518. The ACK can be like the CRQ just described: a single pulse of data one bit long. As mentioned previously, after the leader sends a CRQ it then changes its I/O to "input" 1520 and samples (i.e. reads) the I/O after a prescribed length 1522. Thus, a communications transaction in the form of "CRQ then ACK" occurs when blocks are connected as just described and the leader block has cause to seek out connections on (one or more of) its I/Os.

The leader block might gain cause to seek out connections on (one or more of) its I/Os under central control of the game program (and in the preferred embodiment, only under such control. In other embodiments, the control might be decentralized and be local to the leader block (or the base block) for example.) For example, the game program might send a command addressed to a given block that says, in effect, "See if anything is connected to you at your communications port number 06 . . . . " A more detailed description of such a command follows.

In the exemplary embodiment, communications transactions proceed in the form of command words and response words. After receiving the ACK, the leader will send the command word for which this transaction was just initiated.

Typically, the command word is generated by the game program and sent out addressed to a particular block in order to command the block to do something. An example is, "See if anything is connected to you at your communications port number 06, and if so, transmit to it this command word containing an address. The response word from the newly-contacted block will contain information useful for the game in determining block structure physical parameters such as appearance and connectivity."

After sending the ACK, the follower block sets the I/O of interest back to "input". Then it reads a command word's length of data on I/O of interest, and decodes the command word to proceed based on the command type 1524.

For the core functionality of the invention, the command would be as described above and contain the instructions, "Take this BLOCK_ID if you do not already have one and provide your physical and connectivity data or a keycode to them". If so, the follower block formulates an appropriate response as follows (and shown as the logic path denoted as "1526" in FIG. 15.):

If the block does not already have a BLOCK_ID 1528, then the block takes as its own the BLOCK_ID provided in the TARGET_ADDRESS of the incoming command word 1544. Then the block forms a response word 1546. It builds the FROM_ADDRESS of the response word from the new BLOCK_ID plus the designator (PORTNUM) of the I/O of interest, through which the command came. In the MESSAGE portion of the response word, the block puts the response code equivalent of "Success: this block has retrieved a new BLOCK_ID from the command word and has assigned it as this block's BLOCK_ID." In the "DATA" portion of the response word the block puts the block's keycode.

If the block does already have a BLOCK_ID, the block must check to see if the command word is meant for this block or for a different block connected to this block 1530. A message meant for a different block would be an error for a block being newly connected into the system since the game would not yet have knowledge of blocks (if any) connected to the new block. For "non-newly-connected" blocks, it is possible that the command word is meant for either this block or one connected to it "upstream."

If the block already has a BLOCK_ID and if the BLOCK_ID in the command word matches this block's BLOCK_ID, then the command is meant for this block. The block extracts the PORTNUM from the TARGET_ADDRESS of the command word and proceeds to execute as leader a communications transaction on that communications port (i.e. the I/O with the designation the same as PORTNUM.) 1532. The transaction proceeds similarly to the transaction being described here; the block under discussion either receives a response from upstream or not, and if so, transceives it and if not, generates one and sends it downstream on the I/O of interest via which the original command arrived.

For clarity throughout this description and the associated figure(s), description of error handling is omitted. For example, if the PORTNUM provided in the command does not correspond to any I/O designator on the target block, that is an error and the target block would form an appropriate response word to inform the central command program (e.g. the game) of this error.

If the block already has a BLOCK_ID and the BLOCK_ID in the command word does not match this block's BLOCK_ID, the block checks its routing map for the command word BLOCK_ID 1548. If BLOCK_ID is not found in the routing map Block formulates a response 1549 saying, "ID NOT FOUND" and transitions to step 1546 as described below. If BLOCK_ID is found, the block routes the command to the port given in the first PORTNUM portion of the routing map in which the BLOCK_ID of command's TARGET_ADDRESS is found 1550. This block assumes the role of leader block in routing a command upstream, and the port is referred to as the "upstream port" or "upstream I/O."

Such a communication transaction proceeds with CRQ and ACK as described previously, and possibly a response coming from the upstream block, if such a block is present on the upstream I/O. If a response is received, the block under discussion checks the response to see if it is of a type, "Success: this block has retrieved a new BLOCK_ID from command word and has assigned it as this block's BLOCK_ID" 1536. If so, this block enters that BLOCK_ID into this block's routing map entry for the I/O on which the response came 1538. If the response is of any other type, no further action is taken in this regard.

This block then performs no further in-place processing on response word and sends the response word "downstream" via the original I/O of interest via which the command word came 1552.

After sending a response word downstream, the cycle of processing is complete for simple responses, and the block returns all I/Os to "input" mode, sampling them periodically.

Another type of command is, "Provide the most current sample of some or all dynamic data that this block supplies, as specified in the command word." The logic path for this command is denoted as "1540" in FIG. 15. If such a command is received, the target block samples the requested dynamic data 1542, builds a response word or words 1546, and sends the response downstream 1552. To accommodate amounts of data greater than the typical response word can contain, the response might be of variable length, such as: "Start token>Long multi-word message requiring handshaking and error-checking and correction>End token."

Blocks in certain embodiments of the invention are molded in such a way as to enable existing objects of known shapes to be "cradled" into this receiver block and be held there via friction if the mold is sufficiently complementary to the shape of the object or else via some other securing mechanism such as a strap or locking bar if necessary.

When mated in such a way to an object, the object's appearance and/or functionality can be used to enhance the capabilities of the block system. The molded block ("cradle") possesses at least all of the capabilities of a standard block as described in this invention including ability to mate to and communicate with other such blocks and with a base block.

To simplify connection, the cradle also contains the functionality of a base block, in certain embodiments, thereby eliminating need for a separate base block. To simplify even further, a power pack and a wireless communications transceiver such as WiFi or Bluetooth can be built into the cradle to eliminate the need to connect via cable to the game console.

Thus, the "cradle" can be built into nearly any type of block structure that can be created with the blocks described in this invention, thereby enhancing the capabilities of such structures. The limitation on what types of block structures are suitable for including such a cradle is only a function of the size and shape of the cradle which is driven by the size and shape of the objects targeted for cradling.

The typical uses described here are: cradling a contactless motion sensing game controller and cradling a complete portable gaming device. FIGS. 16 and 17 show exemplary embodiments of both types of use.

Prior knowledge of the structure and appearance of the object to be held is required to allow a representation of the object to be drawn in the game along with the block structure. However, such knowledge is not necessary if the object's appearance is of little importance as is the case when the objective of cradling is to take advantage of the functionality instead of the appearance of the object being cradled.

Prior knowledge of functionality of the object to be cradled is required in order to be able to take advantage of such functionality. For example, a "block" can be molded during manufacture to hold a controller that possess contactless motion sensing capability such as the Nintendo Wii® controller (known as the "Wii-mote") or any other previously-known and measured object in a fixed, known position and orientation relative to the block. An example of such a product is the ThinkGeek "WiiHelm."

Holding the object in place securely may require a separate strap or other locking mechanism. Additionally, a switch may be required that can detect the presence or absence of an object from its cradle (for example a switch driven by a spring-loaded contact which is normally not activated (i.e. the switch is in its open state) but becomes activated (put into the closed state) upon insertion of the object into its cradle.)

When the object is placed into and secured into the cradle, the block system can communicate this fact to the game console. The block structure has enough information and can tell the console to draw the block structure as well as the cradled object.

Further, or alternatively, the system can benefit from whatever functionality of the cradled object is applicable. For example, since the Wii-mote is a motion-sensor and communicates this information to its console, games can be created for the Wii platform that use the (possibly relative) position and orientation of the Wii-mote as a starting point for drawing the surrounding (and cradling) block structure. Thus, the motion sensing features of the Wii-mote are leveraged by the block system. The block system no longer needs to provide motion sensing capabilities of its own.

In this way, the block system described herein can benefit from advanced features of existing hardware by cradling such hardware and communicating with the game console drivers or other software modules that implement such features.

Figures 16A, 16B:
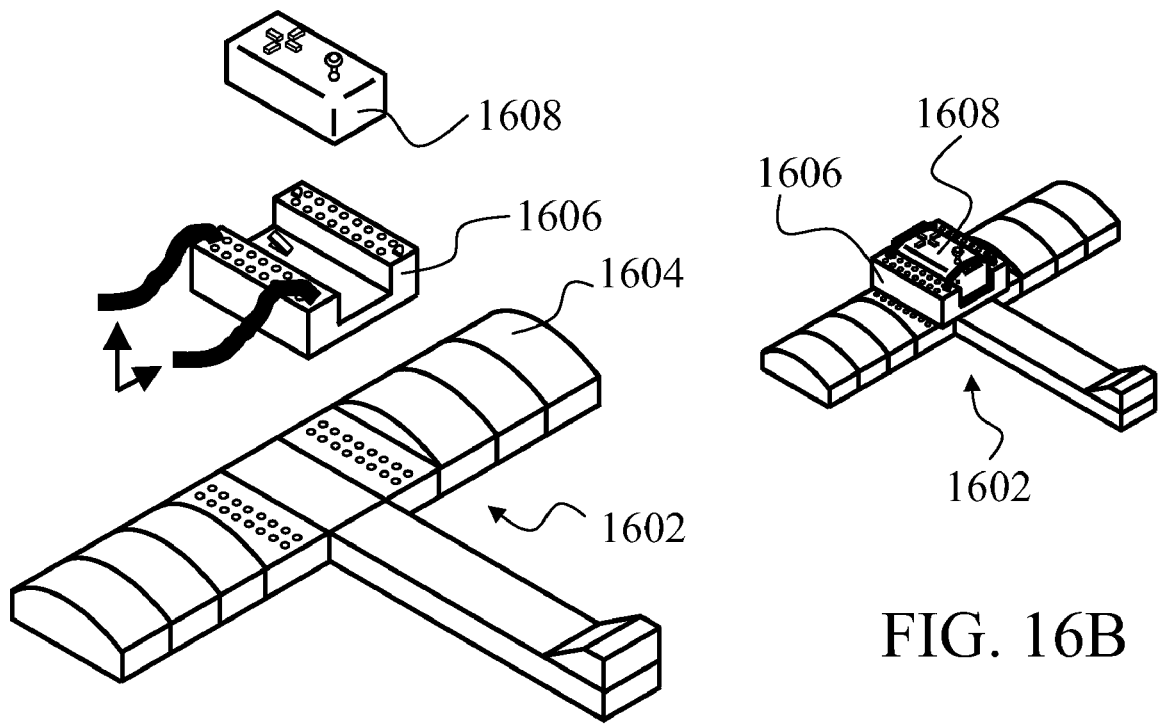
FIGS. 16A and 16B are an exploded and assembled isometric view of a cradle base block adapted for receiving a game controller and an associated structure built from blocks according to the present invention.

The example shown in FIG. 16A provides a user built block structure 1602 which incorporates multiple shaped blocks 1604 having capabilities of standard blocks as defined previously to allow communication of the interconnection and thus the shape of the object built from the blocks, in this case, an aircraft to the video game. Cradle block 1606 is connected to the block structure and provides capability for interconnection of an existing game controller 1608. The final assembly is shown in FIG. 16B. The functionality of the exemplary base block in the figure is molded as a cradle into a shape sufficient to receive a Nintendo Wii "Wii-mote" game controller. This controller provides to the game all standard video game controller input such as joystick control, several buttons, etc. and also provides motion sensing information.

The motion sensing information is such that, for example a ping-pong (table tennis) game can be played with the controller controlling the motion of a player's on-screen ping-pong paddle. The player in the real world can grasp and move the controller like he or she would grasp a real ping-pong paddle, and the on-screen paddle representation moves similarly. The game is developed with access to the Wii-mote motion sensing input and is designed to take advantage of that information.

Similarly a video game is developed to take advantage of the block structure scheme of this invention as well as the motion sensing input that the Wii-mote provides. The cradle as shown in FIGS. 16A and 16B receives the Wii-mote and, using the motion sensing information provided by the Wii-mote, the game can move the on-screen representation of the block structure about the game world similarly to how the Wii-mote and cradle are moved. The on-screen representation can be drawn with or without the Wii-mote depicted, depending on the application and/or user preference.

In the game world, in order to best simulate real-world motion of the cradle-plus-controller, the location and orientation of the motion sensing component(s) inside the existing controller can be estimated before the time of manufacture using existing controller products. The on-screen representation of the cradle can then be drawn in a position and orientation similarly relative to that of the real-world component(s).

The user can in the real world create block structures of arbitrary complexity and then intuitively move the structures about in the real world to effect similar moves in the game world. In the figure, an airplane of sorts is built around the Wii-mote and cradle. The motion sensing capabilities of the Wii-mote allow the user to fly the airplane around in the real world and have the on-screen version perform similarly.

The sensitivity and/or scale of the game-world movements relative to the real-world movements can be adjusted by game routines under automatic or manual calibration, or under direct user control using standard input such as keystrokes, menusets, or perhaps by flying an airplane in a specific way.

Similarly, the cradle can also be molded to enable docking of a complete portable gaming device. Then any block structure built around the cradle will contain all of the hardware, firmware and software necessary for the basic uses described in this invention.

The basic cradling aspects (physical, informational, power-related) are similar to those described for cradling an existing game controller previously described. The device is secured into the cradle and the base block functionality is implemented either inside the cradle or as a separate base block. As in the non-docking application informational and power connections can be activated by connecting to a port on the game device. Alternatively there could be separate power pack and/or a wireless connection built into whatever base block functionality configuration is chosen.

The additional benefit to cradling a complete portable game device is that the block structure becomes a self-contained play unit. When the game device is docked in the cradle, the game machine's processor, input devices, display, speaker and so on become part of any block structure built around the cradle. This allows novel applications and frees the user from needing to remain physically in proximity to a non-portable game console and display device (typically a "box" next to a television, or else a non-portable or semi-portable personal computer.)

For example, as shown in the FIGS. 17A and 17B, a block structure 1702 containing a movable wheel component with measurement sensor can be added to the bottom of a cradle block 1704 in multiple places (or to a similar area on a block structure built around the cradle.) Game device 1706 is then mounted into the cradle block. The block structure is shown in the game world ready to be "driven" around the world. The user moves the "car" in the real world, restricted only by whatever physical barriers exist in the immediate area in the real world, and the game representation of the "car" moves similarly. The game device display shows the movement through the game world, as if the display is a virtual "windshield" or "windscreen" looking into the game world. For operation and communications, the cradle block may include a presence actuator 1708 to determine when the game device is present in the cradle and a cradle communications port

1710 which may be connected directly to a device communications port 1712 in the game device.

The camera view can be chosen and/or positioned (by the user or by the game, for example) to be anywhere in the game world, but for best "feeling" of play can be just behind the "car" facing forward so that the block structure is completely visible or partially visible to the user and the view is similar to that which a "person" might see if sitting inside the block "car" driving it.

Wheels in the cradle example with car and complete portable game device have to be independent so that they can move independently (allowing rotation at different rates) when the vehicle is turned. Thus the wheels' movement cannot be connected to each other by a simple axle. The movement of the "car" in the game world mirrors that of the real-world car with limits on precision and accuracy as a function of several factors such as sensor performance, block sample frequency and calculation time.

With motion sensing capability added to either some part of the cradle, block structure or game device such as a Wii-mote, the need for a physical-contact-based sensing arrangement such as wheels is eliminated and the possibility emerges of "flying" the block structure around a play area. Motion sensing data from the Wii-mote is collected as dynamic data and processed as described with respect to FIG. 20 below.

The basic functionality of the invention requires that video game components such as the drawing graph and the collision detection system in the video game be dynamically alterable. Such technology already exists in standard game engines. For example, the Torque Game Engine from Garage Games along with its publicly available add-ons allows new 3D objects to be inserted into the game world at nearly any time during game play under user or game control. If the proper data is provided with such objects, the objects become part of the game world, get drawn when required (for example on every frame when in view of the camera) and also become part of the collision detection system so that game characters and other game objects can interact with the introduced object(s.) As previously described, the "base" block can also optionally contain many of the features described herein as being part of the game features.

The video game program or program component implementing the present invention contains a module which sends a sequence of commands to the connected block structure to determine the complete static state of the structure at that time. This determination is made at a rate deemed sufficient to satisfy user tastes and/or tolerance for such behavior. The game also queries the block structure similarly to determine blocks' dynamic information if any. The query for dynamic information can occur concurrently with the query for static data, or it can occur at a different rate, for example more frequently because such data is more likely to change more frequently.

Figure 18:
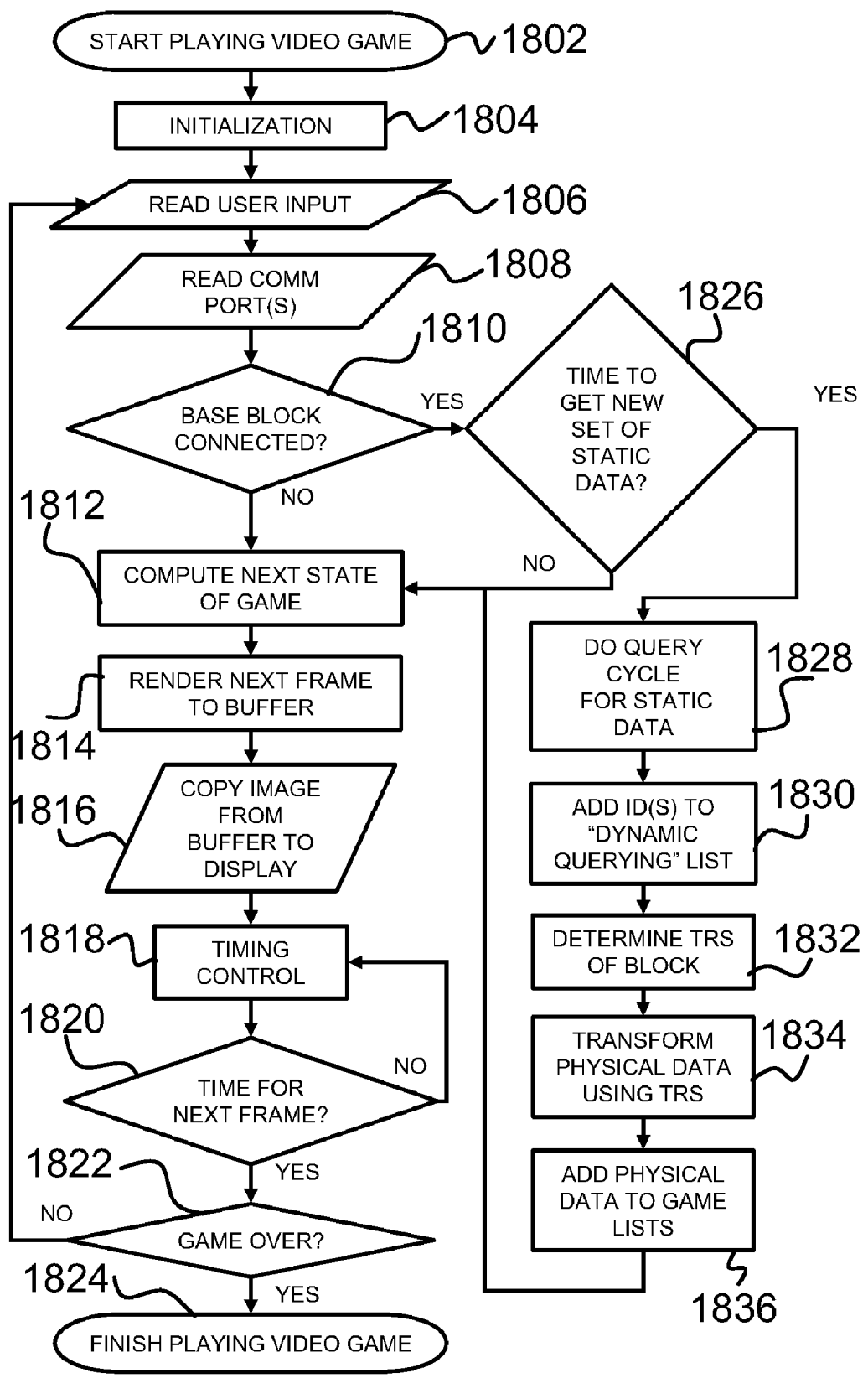
FIG. 18 is a flow chart showing interaction between a video game and block structures according to the present invention.

FIG. 18 shows the logic that the game program follows during a typical usage session for blocks that supply static data only. The user starts playing the video game. The game executes its initialization routine(s) and then enters what is essentially a loop that repeats continually until the user or the game logic itself interrupts the loop for any of various reasons such as to pause or end the game.

The left branch of the figure shows the typical tasks undertaken by most mainstream video game programs. While drawn as a set of sequential tasks, the ordering could be changed to address certain issues as latency, process load balancing and so on. Additionally, although the figure is drawn using standard flowchart notation implying temporal separation of tasks, the game program and/or operating system might be written to allow multi-tasking, multiple processor usage and the like. For example, certain tasks such as mechanical memory access or network data retrieval could be started and run "in the background" freeing up the processor(s) to work on other tasks while the "slow" part of the background task completes.

The core tasks undertaken by most mainstream video game programs as shown in FIG. 18 are executed in a continual loop, with possible interruptions by the user as described above, and when the user starts playing the video game 1802 are as follows: Initialization 1804, Read user input 1806; Compute next state of game 1812; Render next frame to buffer 1814; Copy image from buffer to display 1816; Timing control 1818 with a determination of cycle for next frame 1820. If a determination is made that the game is not over 1822 the loop repeats with reading the next user input. If the game is finished, Finish playing video game 1824 is accomplished.

The present invention adds some tasks to the typical video game program. A task to read communication port(s) input 1808 is added "after" the user input is read. As described previously, describing one task as taking place "after" another is merely a convenience concept used to be able to convey the logic in flowchart form; the actual ordering of events can be varied to address various tradeoffs among game design.

Additionally, some standard video games already contain a task to "read communication port(s)" as part of their core tasks (possibly combining it with the "read user input" task.) For clarity in the figure, this task is listed as separate and specific to this invention.

After the communications ports are read, the game can determine whether a base block is connected 1810 to the game console. For example, the game can send the core command which says, in effect, "Take this BLOCK_ID if you do not already have one and provide your physical and connectivity data or a keycode to them".

If a base block is not connected, then the game proceeds with its normal set of tasks like any existing game. If a base block is connected, it responds to the game's query in an appropriate fashion, and the game then determines that a base block is connected, and can proceed to attempt to determine the nature of the block structure (if any) of which the base block is a part.

As just mentioned, games typically operate in a "loop" fashion, continually repeating the process of calculating game state based on game logic and user and possibly other input, calculating and drawing new frames based on the state and displaying these frames one at a time to the user. This process proceeds typically at "video rates" or similar, for example 30 frames per second or 60 frames per second. The rate can be faster or slower based on processor capability, program optimization, scene complexity and so on.

The task of determining the nature of the block structure (if any) of which the base block is a part can be repeated as quickly as is allowed by such block parameters as the block hardware speed and the number of blocks present in the structure. For static block structure information such as block keycodes and connectivity data, this task can be repeated at a lower frequency than the video refresh rates just described, if necessary, because such data will likely change at "human" rates, significantly slower than video rates (e.g. once or a few times per second compared to 30 or 60 times per second.)

Additionally, this task does not need to be completed in any one given "draw" cycle of the game; it can span multiple such cycles. The game program (or, other software/firmware which controls this logic, which may be contained in the base block instead of the game, for example.) contains a timing module, tuned by design and experiment, to determine a reasonable frequency with which to attempt complete determination of block structure parameters. "Reasonable" is taken to mean, "that which results in an acceptably low time lag between a user causing a change to the block structure and that change appearing in the video game." It is of course a measure subjective to each user, but a rate of once or twice or a few times per second is suggested as a starting point. In other words, if the game performs a query and obtains complete information about the block structure once or twice or a few times per second, the resultant time lag between cause and effect should be acceptable to most users.

When the game determines that it is time to check for updated static data 1826 from the block structure, it performs a query cycle for static block structure data 1828. This process is described in FIG. 19 and its accompanying text.

The end result of such a query cycle is a list of BLOCK_IDs, block physical data (possibly obtained in a sub-step from keycode data that the blocks provide in place of actual physical data,) and connectivity information such as a list of all mated pairs of connectors (with associated BLOCK_ID and connector designation) that are mated in the block structure.

Additionally, some of blocks might provide information indicating that those blocks contain dynamic components such as wheels that turn, the data for which should be queried at a suggested rate in order for the game to simulate sufficiently the dynamic movement of such components. The BLOCK_IDs for such blocks are added to a "dynamic querying" list 1830. Such a list is used in querying for dynamic data, as described in FIG. 20 which provides a flowchart of the query cycle for dynamic block data, adding dynamic block data to appropriate game listing of data to process and processing as appropriate in the video game.

To use an object in the game world (e.g. to draw the object and/or collide with it,) the game must have access to the physical data describing the object itself. Additionally, the game must know the location, orientation and scale (also known as TRS) in the game world at which to draw the object. Determination of TRS occurs is required by this stage of the process 1832.

Using the TRS data, the game transforms the block structure physical data to the desired position, orientation and scale in the game world 1834. Then the game adds this data (or pointers to same) to the game's list or lists of game world objects 1836. Such a list or lists are used by the game for various game tasks such as drawing and collision detection and other physics simulation. Shortly thereafter, the block structure becomes part of the game world, being drawn in the game and able to interact with other game objects.

Figure 19:
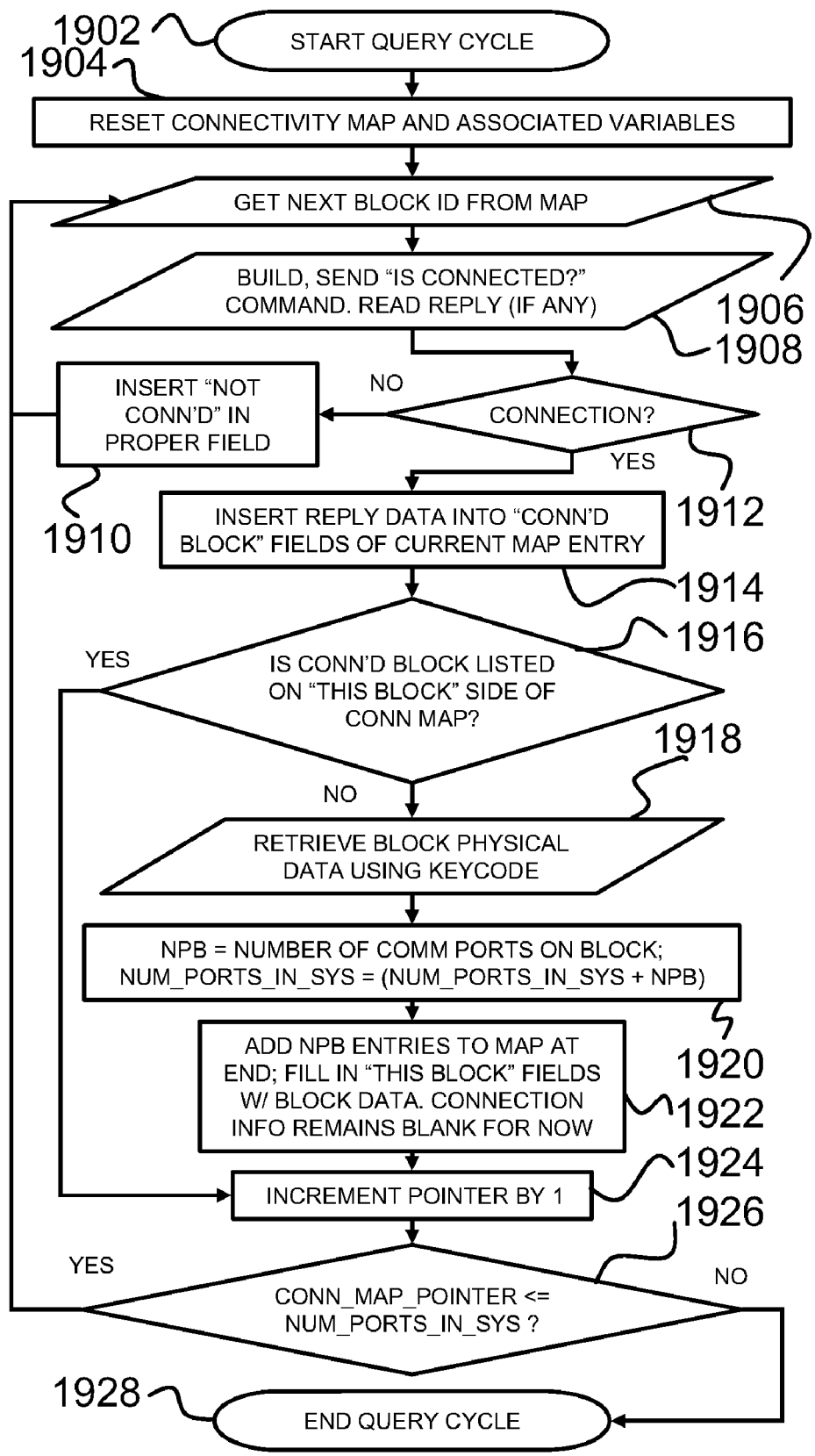
FIG. 19 is a flow chart showing development of a connectivity map of a block structure.

FIG. 19 describes the logic used during a query cycle by the game to determine static block structure data. The scheduling of this query cycle in the context of other game tasks is shown in item 1828 in FIG. 18.

The purpose of this query cycle is to determine what blocks are informationally connected to the game and to determine the connectivity among those blocks. In other words, the purpose of the query cycle is for the game to establish what block structure (if any) has been built by the user for use in the game so that the game can draw a likeness of the structure and insert its physical description data and other information into the game systems that might use it.

Each entry in the connectivity map describes the connectivity of one communications port in the system. On one side of the table shown in FIGS. 23-26 are fields for the entry containing the information describing a given communications port including the BLOCK_ID 2302 of the block on which the port resides, the PORTNUM 2304 designation assigned on that block to this communications port, and keycode 2306 is used by the game to retrieve the block's physical description data.

On the other side of the map is the "connected block" information, containing space for the BLOCK_ID 2308, PORTNUM 2310 and keycode 2312 for the communications port (if any) connected to the port described by the fields on the left side of the map for this entry.

The query cycle described here comprises a set of repetitive actions executed by the game to gather the data from any and all connected blocks to insert into these connectivity map entry fields. As described elsewhere, the game executes this entire query cycle periodically to keep the game information equivalent to the real-world block structure information in a timely manner; the game performs this cycle sufficiently frequently enough to satisfy user perception.

To construct the connectivity map, the core action undertaken by the game is to tell a given communications port to determine if anything is connected to that port. At the start of a query cycle, the communications port under investigation is the game console's communications port, to which, in the preferred embodiment only the base block would be connected, if anything. In the general case, a game console's communications port or ports use a standard such as USB, enabling connection of any peripheral that conforms to this standard. Such a connection would be to the base block's communications port dedicated to game console communications.

Thus, the very first query made by the game to determine connectivity is a special one, with a simple outcome ("base block is connected" or "base block is not connected") and is therefore omitted from the connectivity map for clarity. If the "base block is not connected," then no further action is undertaken by the game to build a connectivity map, since there is no need for one.

This map entry is omitted from the table and further entries start with the designation entry number "0". A pointer called "CONN_MAP_POINTER" in the query cycle points to the map entry under investigation. CONN_MAP_POINTER having a "RESET" value (for example, "−1") indicates that the game console is determining whether a base block is connected to the game console's communications port.

After this initial part of the query cycle, the base block becomes the block under investigation (hereafter referred to as "this block"). In the following description, the base block also has a pre-defined permanent identification code (BLOCK_ID) used to identify it among other blocks in the system. However, this is not strictly necessary in a given implementation; as described shortly, a given block might be assigned such a BLOCK_ID by the game upon first communication to the block from the game.

Prior to using or changing the connectivity map or any other variables, the game program reserves enough memory area to contain them, respectively. The map is empty to begin with and is populated using the information acquired by the game during a query cycle such as described here. At the start of each query cycle, the game clears and resets the connectivity map so that there are no entries in it.

Additionally, the game resets the variable called "CONN_MAP_POINTER" to a reset value such as "−1" as a pointer to keep track of what location in the map is being processed. As mentioned previously, the reset value (for example, "−1") in CONN_MAP_POINTER is a special case, omitted from the connectivity map, and indicates that the game console is determining whether a base block is connected to the game console's communications port.

The game also resets a variable called "NUM_PORTS_IN_SYS" to the value "0" to denote the number of communications ports in the system across all blocks that the game currently knows about. Similar to the special handling by CONN_MAP_POINTER of the communications port connection between the base block and the game console, NUM_PORTS_IN_SYS includes neither the base block's communications port connected to the game console nor the game console's communications port connected to the base block.

Hereafter in this description, value assignments will use the following notation when a variable is first introduced: CONN_MAP_POINTER=X; (pointer in connectivity map tells which location is being processed) and NUM_PORTS_IN_SYS=Y; (number of known communications ports in system); where "X" and "Y" are some value.

For subsequent value assignments for variables that have been introduced previously, the descriptive text following the assignment will be excluded. Additionally, it is assumed that memory storage has been reserved by the game program prior to using any variables so listed.

Again, the very first query of the query cycle is special: To determine whether the base block is connected. This can be done using the same commands the game uses to determine connectivity of any other type of block, but for simplicity's sake in this description this generalization is omitted. Thus, when CONN_MAP_POINTER equals its reset value such as "-1", some of the logical processing steps shown in FIG. 19 are executing actions on the omitted connectivity map entry which describes the base block comm port connection to the game console comm port.

In the exemplary embodiment being described, a given block's reply provides a keycode. Upon receipt of the keycode the game uses the keycode to retrieve the block's physical description data from a previously stored location such as on the game program disk or over a network. The physical data includes the number of communications ports present on the block.

Thus, upon reply of a block providing its keycode, the game retrieves the physical data if necessary 1918 and then makes the following variable assignments: NPB =number of communications ports given in block's physical data (e.g. "8"); and NUM_PORTS_IN_SYS=(NUM_PORTS_IN_SYS+NPB) 1920.

That is, the game adds a number of entries equal to number of communications ports on the newly-found block (NPB) to the connectivity map at the end of the map (i.e. starting with an entry numbered with the value "CONN_MAP_POINTER plus 1"). Then, into each "BLOCK_ID" and "BLOCK_KEYCODE" field inserts into the respective values as received in the block's reply 1922. Such storage can be made more efficient by, for example, only storing "BLOCK_ID" and "BLOCK_KEYCODE" once for the whole block instead of for each communications port.

The "PORTNUM" field for each entry is also filled in using the communications port designation information stored in the block's physical data. Typically the ports are numbered starting at zero and assigned increasing consecutive numbers.

For each of the entries just added to the connection map, the fields describing the connection information are empty. Adding appropriate information to these fields is the main objective of the remainder of the query cycle, as described next.

The game makes the following mathematical determination for CONN_MAP_POINTER<=NUM_PORTS_IN_SYS ? (Is CONN_MAP_POINTER less than or equal to NUM_PORTS_IN_SYS?) 1926.

The game program compares the connection map pointer to the number of communications ports in the system. The pointer keeps track of which communications ports have been processed in this query cycle, and each communications port is represented as an entry in the connectivity map. As noted above, NUM_PORTS_IN_SYS does not include the ports used between the base block and the game console to communicate with each other.

Thus, if the pointer is of lesser or equal value to the number of ports in the system, the game continues its processing of the map by processing the entry pointed to by the CONN_MAP_POINTER variable returning to the Get Next Block step 1906. For example, if CONN_MAP_POINTER="1", the game program processes entry "1" in the map. Hereafter in this discussion the entry pointed to by CONN_MAP_POINTER is referred to as the "current (map) entry." The processing of the current map entry proceeds by building and sending a command an "is connected?" command and reading the reply.

The game retrieves the BLOCK_ID and PORTNUM information from the "this block" fields of the current map entry game and assigns them to their respective fields in the TARGET_ADDRESS of the command word. FIG. 10A and its associated description define the command word structure.

The game retrieves, determines, or otherwise obtains a BLOCK_ID as yet unused by any block in the system. To achieve this, for example, a variable of sufficient capacity can be given an initial value at the beginning of the query cycle, and incremented each time a new BLOCK_ID is given out. The game inserts this BLOCK_ID into the DATA portion of the command word under construction.

In the COMMAND portion of the command word, the game program inserts an encoded equivalent of the command, "Is there something connected to the communications port described by the TARGET_ADDRESS? If so, the connected block shall take as its BLOCK_ID the BLOCK_ID provided in the DATA portion of the command if it does not already possess a BLOCK_ID, and further, the connected block shall reply with its keycode as well as with the connected block's BLOCK_ID."

The game sends the command outbound to the target block 1908. The blocks in the block structure route the command to the target block as described in the section regarding the "routing map" in a block, storing the PORTNUM information for the port on which the data arrived from "downstream", for use later in routing a response back to the game console. The target block reads and interprets the COMMAND portion of the command, and thereby attempts communications at its communications port numbered the same as the PORTNUM field of the command.

If a block is not connected at the specified communications port 1912, the game inserts into the connectivity map BLOCK_ID field of the "connected block" side of this map entry a code equivalent to "Not Connected" 1910. Then the game continues the query cycle by incrementing CONN_MAP_POINTER, comparing it as described above to NUM_PORTS_IN_SYS, and if more entries remain to be processed, the game continues by processing to get the next block ID from the map 1906 in the same manner as just described.

If a block is connected at the specified communications port, in the communications transaction that ensues, the connected block will ultimately send a reply to the target block including the connected block's BLOCK_ID, PORTNUM, and keycode data. As described in FIG. 15, the BLOCK_ID might be the one provided by the game in the DATA portion of the command just sent, or it might be one that the connected block already possessed.

The blocks in the block structure route the connected block's reply inbound back to the game in a fashion similar to the outbound routing, using the previously-stored PORT-NUM which describes port on which the command came "outbound" from the game. Upon receipt of the reply, the game inserts the connected block's BLOCK_ID, PORTNUM and keycode into their respective fields on the "connected block" side of the current map entry 1914.

Then the game checks to see if the connected block's BLOCK_ID is already listed in the connectivity map on the "this block" side 1916. If so, then no further action is taken for this entry, and as before, the game then increments the connectivity map pointer CONN_MAP_POINTER 1924, compares its value with NUM_PORTS_IN_SYS 1926, and if more entries remain to be processed, proceeds with processing the next map entry in the same manner as just described.

If the connected block's BLOCK_ID is not listed in the map, the game then uses the keycode to retrieve the connected block's physical data 1918 and, as above, adds to the end of the map a number of entries (NPB) equal to the number of communications ports 1920. If the process map entry pointed to by CONN_MAP_POINTER has data, the NPB entries are mapped filing in the "this block" fields with block data leaving the connection info blank. 1922.

Note that as new blocks are found connected to the system, the number of entries in the connectivity map grows so that even if the CONN_MAP_POINTER is processing the final entry in the map, the query cycle might not be completed because the game may find another block connected at the port represented in the current map entry, and therefore more entries needing processing are added to the map. A virtually unlimited number of blocks can be added to the system, because block IDs can be assigned dynamically, so that the game can still talk to block 1,296 or whatever when that block is connected. Communication speed and game memory capacity limit the number of total blocks based solely on acceptable response times.

When CONN_MAP_POINTER is incremented beyond the value NUM_PORTS_IN_SYS, indicating that all entries have been processed and all connected communications ports (and hence all connected blocks) have been discovered, the query cycle for static block structure data is complete.

Figure 20:
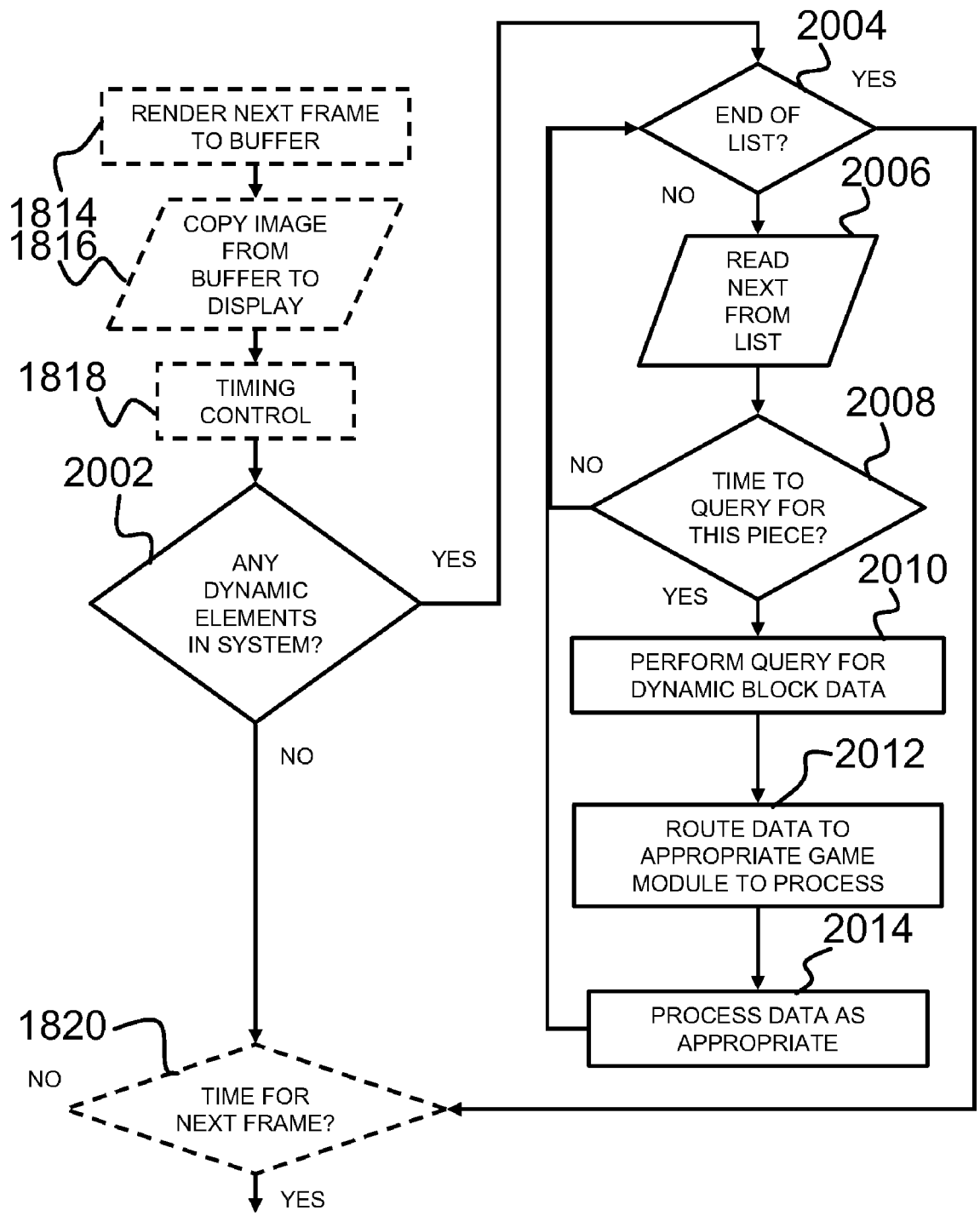
FIG. 20 is a detailed flow chart of interaction with dynamic elements present on blocks.

The logic used by the game program to gather dynamic data during a typical usage session is shown in FIG. 20. Part of the figure consists of a portion of FIG. 18; the task of performing a query cycle for dynamic data fits into the logic of FIG. 18 and for clarity only the neighboring portions of that logic is replicated in FIG. 20, using objects drawn with dashed lines.

As discussed previously, a block can provide static and/or dynamic and/or other types of data to the game. When a block is capable of providing dynamic data to the game, the game learns of this capability in one or more of several possible ways. For example, commands and responses can be added to the communications protocol to process specific requests by the game for such information. Alternatively, the details regarding a block's dynamic capabilities can be part of the pre-stored physical and other block data which in the preferred embodiment is accessed via the keycode provided by the block during initial connectivity map generation by the game. The latter method is described here.

The "other data," accessed by the game via the block's keycode, contains fields describing the capability, format, requirements and so on of the dynamic data and its use. For example, if a block contains a pushbutton that can be in either an "PRESSED" or "NOT PRESSED" position, the "other data" accessed by the block's keycode might contain the following information. A flag indicating that this block is capable of providing dynamic data to the game. A field telling the game that this dynamic data should be sampled at least 20 times per second. A field indicating the amount of data required to transport this dynamic data. For example, one single bit of data, one 16-bit word of data, and so on. A field describing the local address of this dynamic data generator. For example, if there are multiple such data generators on the block each requiring a different sample rate, this field can be used by the game to request samples of individual data generators. A set of data describing physical data to be used by the game for each state of the pushbutton and how it should be used. For example, a description of the physical likeness of the pushbutton can be provided as a separate set of data along with the block's main physical data and the "state" data can link the "PRESSED" and "NOT PRESSED" states of the pushbutton with different TRS values (translation, rotation, scale) of the button physical data. This would enable the game to draw the game world representation of the button in its pressed and non-pressed positions, mirroring the real-world action.

Typically, but not always, the suggested or required sample rate of a given dynamic data element will not exceed the video refresh rate of the game. Thus, the logic in FIG. 20 shows the game making the determination of whether it is necessary to sample dynamic data 2002 just prior to the frame time determination. However, in practice these processes do not necessarily need to occur in such sequence; it is sufficient to use other types of timing mechanisms in order to effect the proper sample rates for all systems needing them.

The figure shows a "polling" sample scheme wherein the determination of whether to sample occurs at a regular interval not necessarily attuned to the desired rate(s). An "interrupt"-based scheme would provide more accuracy between the suggested and the actual sample rate(s). As shown, the various rates available dynamic elements would be limited to integer fractions of the video rate such as 1×, 0.533 (one-half), 0.3333× (one-third), 0.25× (one-quarter) and so on. This might not be a limitation, for example if the actual sample rate of a given piece of dynamic data still exceeds its suggested sample rate. The remainder of the description assumes the usage of the "polling" type sample scheme shown in the figure.

As blocks are found by the game to be part of the system, the game builds a list of all dynamic elements in the system needing querying. During the processing of each frame of video the game also processes this list 2006 and at the appropriate time for a query 2008 performs a query cycle 2010 for each piece of dynamic data needing update.

The game routes each piece of received dynamic data 2012 to its appropriate game module for processing 2014 such as a list of data to draw or send to an audio device. Continuing the example of a pushbutton introduced above, the game would send to its drawing module the state of the pushbutton and/or its related physical data to enable the drawing module to draw the pushbutton in the proper position. A determination is made if the list is complete 2004 and if not, the read cycle is repeated.

The dynamic data querying and processing do not need to happen sequentially for each piece of data, nor even in the same logical branch of the game program. FIG. 20 shows it as such for simplicity. For example the game could sample all of the listed dynamic components first, and then process all pieces of data at a later time. The dynamic data querying and processing continues until no other dynamic components require sampling at this time. Then game processing continues as in FIG. 18.

Blocks and block structures become part of the game world. To make the block usage most believable, useful and fun to the user, the blocks/structures can also optionally become part of whatever physics simulations are present in the game world. This may require physical information beyond structure and appearance to be communicated by the block (either directly or indirectly) to the game console. For example, mass, mass distribution, drag coefficients and the like might be required for a given block's application. For optimization purposes, a different simplified geometrical representation of the block known as a collision mesh might be provided by the block to the game.

For example, as previously described, block pieces can be manufactured into shapes with physical relevance such as an aerodynamic wing. Such a block piece can communicate to the console any additional physical information required to include it realistically in a physics simulation.

This block piece (and whatever structures into which it is incorporated) can be included in a physics simulation engine present in the game to behave as it physically might in the real world: If there are winds present, or if the block structure with wings is pushed off of a cliff in the game world, the physics engine can simulate the resultant behavior (or an approximation thereof) of the block structure because the engine has been provided enough physical information from the block.

Figure 21:
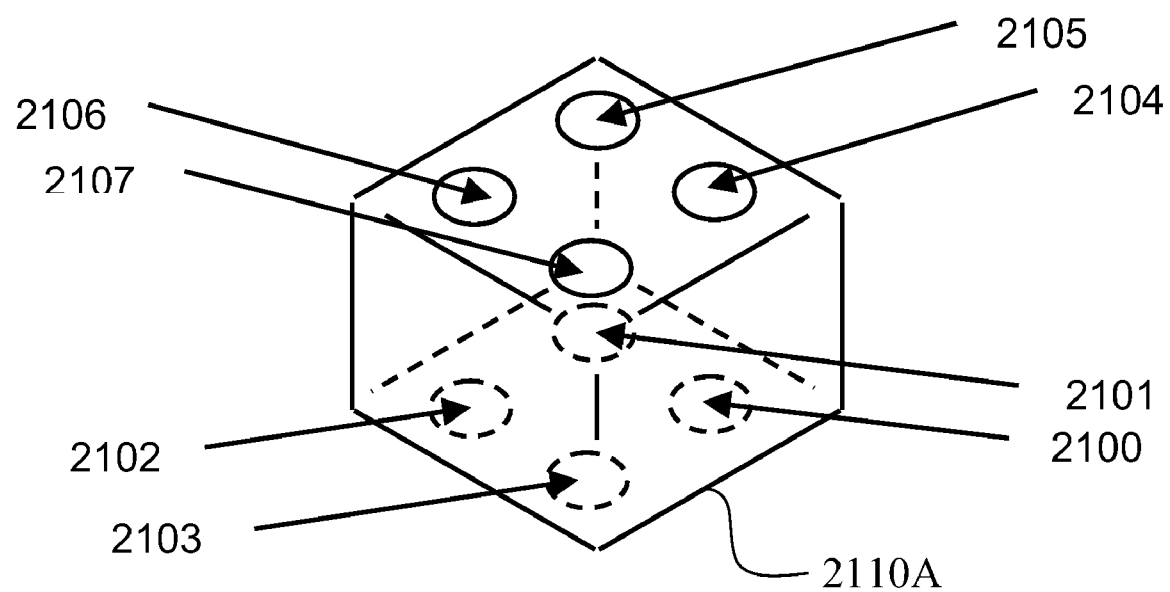
FIG. 21 is an exemplary block for description of connector interaction.
Figure 22A:
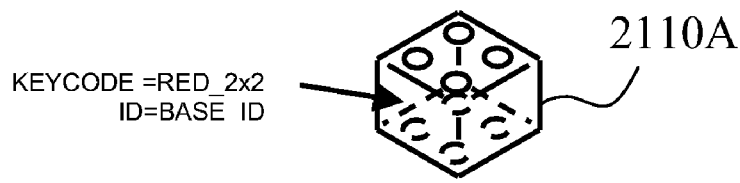
FIGS. 22A, 22B and 22C are exemplary assemblies of blocks having a structure according to FIG. 21.

As a complete example of a block structure with the associated mappings, FIG. 21 and FIGS. 22A, B and C show blocks 2110A, 2110B and 2110C that would ultimately result in connectivity maps as shown in FIGS. 23-26. FIG. 21 shows the locations and designations of the communications ports on a block used in the connectivity map example. As elsewhere suggested as a possibility, each communications port is coincident with one of the physical connectors that link two adjacent blocks. Connectors on bottom of block 2110A, 2100 through 2103 (designated 01-03 in the connectivity maps of FIGS. 23-26) are opposite gender of those on top, 2104 through 2107 (designated 04-07 in the connectivity maps). The connector locations and designations are part of the "physical data" provided by the block either directly or indirectly (e.g. via keycode) and are used in constructing the connectivity map and routing maps necessary to recreate a block structure that consists of more than one block.

Note that each connector is shown in simplified form as a two-dimensional circle located on the surface of the block. For the purpose of the part of the example where the determination is made of relative position and orientation of mated blocks, the connector point of reference is located in the center of that circle. Thus when such a connector is mated to another of opposite gender, their respective points of reference become coincident, located within a small tolerance in the same location in space.

The block structure that the user builds and the steps used to build that structure during this typical use is shown in FIGS. 22A, B and C for a single block, two interconnected blocks and a three block structure.

To demonstrate the development of a connectivity map, the following steps are accomplished. The user attaches a base block 2110A and only a base block to the game console. The game enters a new connectivity map (re-)generation cycle. The game queries comm port and finds a base block. The base block sends a RESPONSE word. Its ID BLOCK_ID (the base block has a fixed BLOCK_ID so the base can respond immediately with this ID); and its keycode for its physical data. The RESPONSE word has the data From_Address with BLOCK_ID=BASE_ID and PORTNUM="GameCommPort"; MESSAGE=irrelevant; DATA=keycode to this block's physical data="RED_2×2."

The base block resets its routing map. The game resets its connectivity map and begins to (re-)generate the connectivity map. Using the keycode that the base block just provided, the game reads the base block's physical data from a pre-stored area. Physical data includes but is not limited to: geometrical data describing in 3D space block appearance and location and enumeration of the "all-in-one" physical/comm/power connectors; aesthetic information such as surface color and surface lighting model and surface shading model.

As the physical data just read indicates that the base block contains eight (8) comm ports, the game inserts eight entries into connectivity map (entries 00-07), one for each of base block's comm ports. As shown in FIG. 23, these entries contain information only for "This block's . . . " section, with no " . . . connected to . . . " information yet.

In other embodiments, the "physical data" could be provided in a complete or more complete form than the keycode method just described. A protocol is in place for this case as previously described with the tradeoff that sending actual physical data takes significantly more message transactions and time than just sending a keycode.

The Game then processes Entry_00 (as denoted by "MAP ENTRY NUM") of connectivity map as follows. The game seeks the next available block ID from connectivity map. Such a block ID can be any value as long as it is unique among block IDs and within the limitations of what the block can store; the value "0FE1" is chosen here at random. The game constructs a COMMAND as follows using the format of FIG. 9. "Target_Address" with BLOCK_ID="BASE_ID" and PORTNUM="00"; "COMMAND"=Core Command #1 (as denoted in the "Commands" section of this document)="NEW_ID"="If this block does not already have an address, take the address provided in the data section of this command message and assign it as this block's address for communications addressing purposes. In the RESPONSE word, provide information directly or indirectly sufficient to draw a likeness of this block in the game, along with information describing connectivity to blocks connected directly to this block." "DATA"=New block ID="0FE1"

The game sends that COMMAND to the base block. The base block reads COMMAND, checks Target_Address and sees that COMMAND is addressed to it, so it reads the PORT-NUM and initiates a communications transaction to try to transmit the COMMAND through that port. Before the user attaches any blocks to the base block, the base block will fail in any attempt by it to communicate with other blocks through any of its ports. Thus, as the base block attempts to communicate with Port_00 where there is nothing connected, the base block receives no reply on that port after a pre-determined time. The base block formulates a RESPONSE to game in the format of FIG. 10 telling about the failure, or "nothing connected there" situation. From_Address with BLOCK_ID="BASE_ID" and PORTNUM="00", MESSAGE="Core Response #3" (as denoted in the "Responses" previously described with respect to FIG. 10 and Table 2)="FAILURE: No block found at port given in Target_address." Data="0FE1" (same as command that this response is answering.)

The game receives this response and notes in the connectivity map that there is nothing connected ("not Conn'd") at Port_00 of the base block at this time.

The game proceeds to process Entry_01 through Entry_07, and each time a repeat of the previously described steps occurs, resulting in the game determining that there is nothing connected to any of the base block's comm ports. The connectivity map at this time is shown in FIG. 24

As the game has reached the end of the connectivity map and added no new entries, the game terminates processing of connectivity map entries thereby ending this connectivity map regeneration cycle.

At the end of each connectivity map regeneration cycle, the game proceeds with its other routines, and at some time after regeneration enters its block-structure-re-creation routine. This re-creation routine uses the connectivity map data (and data linked to by any keycodes therein,) and results in the game being able to insert a likeness of (and all other data relating to) the entire block structure into all game routines that are scheduled or enabled to use such data. For example, the game can then draw a likeness of the entire block structure complete with block relative positions and orientations.

For improving and/or optimizing translate, rotate, and scale (TRS) information automatically and/or under user control, the game uses a separate routine, described below.

As described previously, the connectivity map regeneration rate is chosen to not exceed the user's tolerance for time lag between certain actions in the real world and when their effects show up in the game world. At the next time-to-regenerate-connectivity-map, a command is sent to all blocks represented in the map to "reset your routing map" (Core command #2.) The connectivity map is then reset, and the process outlined above is begun anew. For example, if the connectivity map regeneration rate is approximately "twice per second," then the process just outlined will repeat approximately two times per second. If there is no further action by the user other than connecting the base block and leaving it there, then the steps outlined above repeat for the duration of the game play session.

For block structures of reasonable complexity, this process typically takes a small percentage of the overall game program's processing time. Some portions might be suitable for use with parallel processing techniques to improve performance.

Figure 22B:
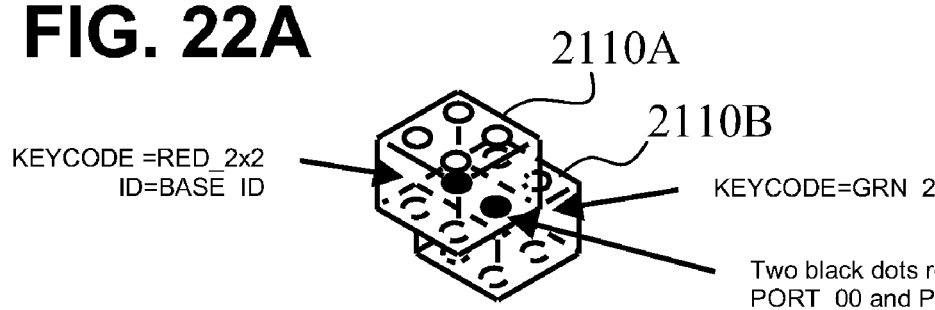

When a second block 2110B is added as shown in FIG. 22B, Port_00 and Port_01 of the base block connect to Port_07 and Port_06 respectively on the newly connected block.

Upon connection to power (in the exemplary embodiment, when the ports are connected to the base block's ports), the newly connected standard block executes its initialization routines. It places all of its communications ports into "read" mode and begins reading each port frequently enough to not miss any attempts by another block to communicate with any of the ports. It resets its routing map to be cleared with no entries.

This process is completed in a short enough time to not conflict meaningfully with any communications attempts by the block to which this block is connecting.

On the next connectivity map (re-)generation cycle after the new block is connected into the system, (or else before the map entries for the base block Port_00 and Port_01 get processed,) when the game instructs the base block to "see if anything's connected" to the base block's Port_00 as described above, the newly connected block detects the communications initiation attempt on its Port_07 and responds appropriately and the communications transaction transmitting the "NEW_ID" COMMAND (Core Command #1) from the base block Port_00 to this block's Port_07 is executed.

The base block places its Port_00 into a wait mode to wait for a RESPONSE. In the exemplary embodiment, the base block at this point suspends other operations in favor of waiting for a response on Port_00, its currently active port.

In the exemplary embodiment, the newly connected block will not upon initial connection into the system possess a BLOCK_ID itself. In such a state (e.g. "NO_ID"), the block upon receiving a COMMAND word reads the command portion and, if "NEW_ID" is the command, then takes as its own the BLOCK_ID provided in the "Data" portion of the COMMAND. Thus, even though the Target_Address is for another block (typically the block which just transmitted the command to this block), this block uses the COMMAND for itself. Therefore, the newly connected block takes as its own BLOCK_ID the ID "0FE1".

When a block is in possession of a BLOCK_ID, its normal mode of operation upon receipt of a COMMAND is to first look at the Target_Address to determine if the command is intended for this block or, by referring to this block's routing map, if the command is intended for a block that is reachable directly or indirectly via one of the block's communications ports.

Block "0FE1" builds a RESPONSE to the command it just processed, in the format of FIG. 11 with From_Address with BLOCK_ID="0FE1" and PORTNUM="07", MESSAGE="Core Response #1" (as denoted in the "Responses" section of this document)="SUCCESS, got new ID"="'SUCCESS': This block has retrieved a new BLOCK_ID from COMMAND word and has assigned it as this block's BLOCK_ID. The block's BLOCK_ID plus the port designator (PORTNUM) on which this communication is taking place is stored in this RESPONSE word's From_address field. Also, the 'physical likeness data' that can be used directly or indirectly to draw the block's physical likeness in the game is stored in the RESPONSE word's Data field." DATA=keycode to this block's physical data="GRN_2×2."

Block "0FE1" sends this RESPONSE on its Port_07, with the pre-defined communications protocol dictating which block is to be "leader" or "follower" at which times in the communications transaction.

The base block receives this RESPONSE on its Port_00. Upon receipt of a response from an upstream block, a block looks at the MESSAGE portion of the RESPONSE to see if it is of a type to require routing map update and if it is, the block extracts the BLOCK_ID from the From_Address portion of the RESPONSE and adds this BLOCK_ID to the routing map entry for the port on which the RESPONSE came, in this case Port_00, if such entry does not already contain that BLOCK_ID.

Response types that require routing map update for blocks which the RESPONSE flows through are, for example. "Core Response #1," and "Core Response #2," both of which are possible responses to "Core Command #1," which essentially poses the question and request, "Is there something connected on this port and if so please respond with your ID."

Since block 0FE1 has responded with "Core Response #1," the base block knows it needs to update its routing map and so extracts the BLOCK_ID=0FE1 from the From_Address of the RESPONSE and adds "0FE1" to its routing map's entry for Port_00. Hereafter, until the next routing map reset event, the base block can successfully route any COMMAND addressed to the block having BLOCK_ID="0FE1." The base block would route such a command via base block Port_00.

After extracting routing map information (if any), a block (in this case the base block) routes the RESPONSE downstream on a port the location of which is known to the routing block by a practice of storing in memory the port number on which a COMMAND arrived from downstream, and later sending the RESPONSE to that command back downstream. In this case, "downstream" is directly to the video game comm port.

This is similar to but separate from the practice of placing into "hold" a comm port on which a block transmits a COMMAND upstream, awaiting a RESPONSE on that same port, as described some steps above.

The game receives the RESPONSE from block "0FE1." As this RESPONSE is in reply to a COMMAND built to process Entry_00 of the connectivity map, game now extracts the information from the RESPONSE and updates Entry_00 by adding the BLOCK_ID, PORTNUM, and keycode information as shown in FIG. 25.

The game also at this time uses the keycode just received to retrieve block physical data from the pre-stored area. Similar to how the game populated the connectivity map with entries for each of the base block's communications ports, so does the game at this time append eight entries into the connectivity map (entries 08-15), one for each of the newly connected block's comm ports.

These entries contain information for "This block's . . . " section, as well as whatever redundant information in the " . . . connected to . . . " portion as can be determined from prior entries. For example, since the connectivity map shows at this time that the base block's Port_00 is connected to block "0FE1"'s Port_07, the game routine can populate the " . . . connected to . . . " portion of the connectivity map entry corresponding to block "0FE1"'s Port_07.

The game continues by processing Entry_01 of the map, by sending a Core Command #1 to the base block's Port_01. Block 0FE1's Port_06 is connected at that port, so that block responds with a Core Response #2, which says, "'SUCCESS, WITH QUALIFICATION': This block has received the command properly and observed the new block address in the COMMAND word but this block already possessed a valid block address . . . ."

This response is routed through the base block, which, seeing a type of response that requires the intermediate block to update its routing map (as described above), adds "0FE1" to its routing map's entry for Port_01. FIG. 25 shows the map state when the game is finished processing the map entries related to the base block (Entry_00 through Entry_07), but before the game has processed the entries for block 0FE1 (Entry_08 through Entry_15.)

The game continues by processing block 0FE1 's map entries (Entry_08 through Entry_15) by forming and sending Core Command #1 ("NEW_ID") commands addressed to block 0FE1 for each of that block's ports using the command format of FIG. 9.

RESPONSEs from block 0FE1 to the game's COMMANDs sent to process Entry_08 through Entry_15 of the connectivity map are routed through the base block as described above. As there is nothing connected to block 0FE1, no "SUCCESS, got new ID" commands are routed through the base block, so the routing map for the base block does not change.

As there is nothing connected to block 0FE1 and nothing else connected to the base block the connectivity map regeneration cycle ends with the map in a state as shown FIG. 25, with the addition of "not Conn'd" in each of the entries (Entry_08 through Entry_14) for block 0FE1 not already containing an entry in the BLOCK_ID column of its " . . . connected to . . . " portion.

The game proceeds with its other, post-connectivity-map-regeneration routines as described above, ultimately drawing a likeness of the block structure shown in FIG. 22B.

As above, before the start next connectivity-map-regeneration cycle, a command is sent to all blocks represented in the map to "reset your routing map" (Core command #2.)

If the user performs no further actions after those described above, the game repeats the connectivity map re-generation as described at or approximately at the "refresh" rate also described above.

As an optimization the game can via an auxiliary routine reduce the number of COMMAND/RESPONSE cycles it initiates with the various parts of the block structure by sorting through the connectivity map and eliminating from the query cycle those map entries which are redundant to others. For example, if two blocks of the same type are mated with one stacked directly on top of and aligned with the other such that all ports on one side of one block mate with all ports on one side of the other block, then only two comm ports of one of the blocks needs to be queried to determine the connectivity between the two blocks. Queries for the remaining ports on the same side as the respective connected ports of both blocks can be skipped as long as those the game continues to query the original two connected comm ports (on each block) and the ports continue to be retain their original connectivity.

This is due to several factors. One factor is the connectivity map optimization already described, wherein no query needs to be made on a port of a block which is connected to a port on another block which has already been queried.

When the relative position and orientation between two blocks is determined, then their complete connectivity (that is, the listing of each comm port pair on the blocks that are connected to each other) is also determinable. This is due to the fact that the physical data of each block contains the locations of each of their respective comm ports and by determining the relative position and orientation of two mating blocks, the relative position and orientation of every point on the two blocks is then also known. Additionally, connectors on all blocks in the system are located physically using a "grid" type layout, with adjacent connectors on a block being located some integer multiple of a basis set of unit measurements away from each other, in each of one and/or two and/or three dimensions on a given block. All blocks use the same "grid" type layout, thereby allowing alignment of their respective connectors with those on other blocks.

By then running, for example, an algorithm to determine within a given tolerance the relative proximity of each pair of connectors on the two blocks (with one of the pair on one block and the other of the pair on the other block,) a determination with a high degree of confidence can be made as to which pairs if any consist of ports connected to each other.

The relevant information in the connectivity map entries related to each of the connected ports can be determined from such a connectivity determination, and those entries skipped during the connectivity map regeneration cycle as long as the two sets of ports originally found to be connected are queried and retain their original connectivity.

Figure 22C:
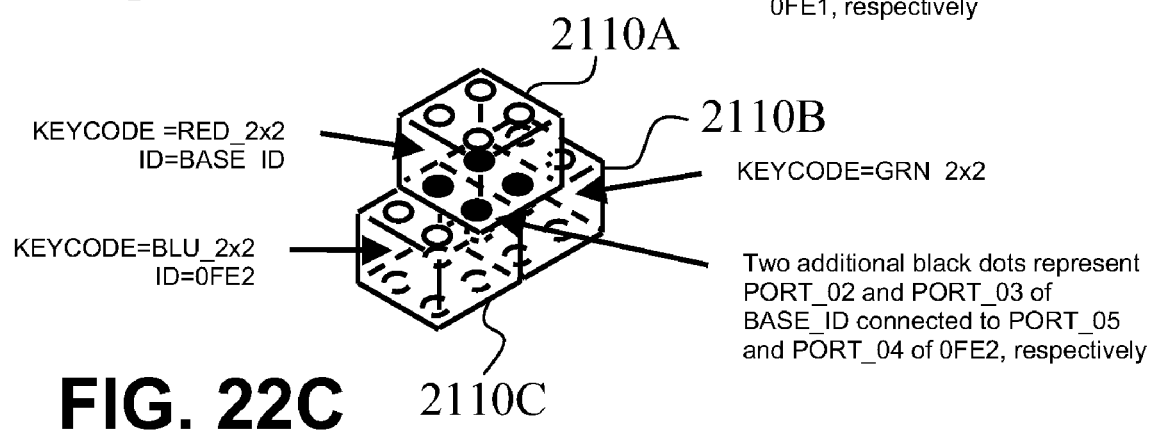

When the user attaches a second standard block 2110C to the base block as shown in FIG. 22C, Port_02 and Port_03 of the base block connect to Port_05 and Port_04 respectively on the newly connected block.

On the next map regeneration cycle (or before the map entries for the base block Port_02 and Port_03 get processed,) the game finds the newly connected block and the steps as outlined previously are executed: The game assigns "0FE2" as that block's ID (as "0FE2" was not used in the previous queries to block "0FE1" and therefore can still be used as the next available ID); the game retrieves information from the block, adds entries to the connectivity map, and updates the game dataset(s) for inclusion of the new information in the game.

The queries from the game result in the base block adding "0FE2" to its routing map entries for Port_02 and Port_03.

The complete routing map for the example is shown in FIG. 26. Any subsequent connections to block "0FE1", for example, would be appended to the routing map entry for Port_00, since that is the port that would be found first when searching the routing map for "0FE1". The final routing map is shown in FIG. 26.

Further addition of block(s) to the block structure result in similar procedures being undertaken.

For the embodiments of blocks described herein, blocks can be mated to another as long as at least one nubbin on each is aligned, so can the devices in the exemplary embodiment in this invention be physically, electrically and informationally mated. However, when nubbins are single-axis-rotationally-invariant of the infinitely variable type as previously described with respect to FIGS. 3A, 3B and 5A-5D, certain relevant connectivity information such as relative position and orientation of adjacent blocks is obtainable only when at least two nubbins on each block are connected.

The "two-nubbin" dependence for relative position and orientation determination can be overcome by increasing the number of informational connections per nubbin and placing them at known angular and radial offsets about the central axis. Such a connector is show in FIGS. 27A-27D. For example, by increasing the number of duplex or half-duplex signal connectors per nubbin to four 2702A, B, C and D and arranging the four in a quadrant grid such that there is one connector per quadrant with each connector being angularly offset about the center of the connector (employing a ground pin 2704 in the embodiment shown) from its neighbors by 90 degrees, and further identifying the angular location of a connector in the connectivity data it exchanges with its neighbors, the containing block can be connected via a single nubbin to a similar block in any of four 90-degree rotations such that the connectors the first block line up with those of the second block. Other pins in the grid are provided for power (2706A, B, C and D) however, multiple power pins are not required in many embodiments.

Figure 28A:
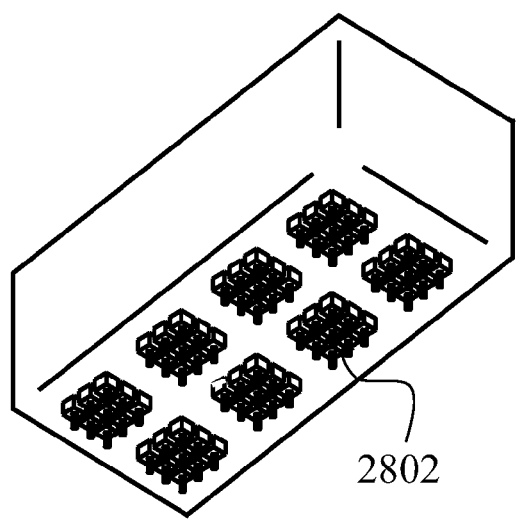
FIGS. 28A and 28aB are isometric bottom and top views of a block incorporating connectors as defined in FIGS. 27A-27D; and, FIG. 29 is a flow chart demonstrating a determination of block relative position.
Figure 28B:
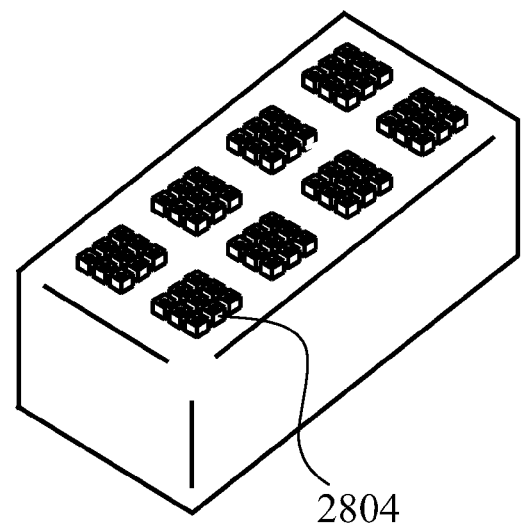

Each of the four possible relative orientations between two such connectors results in a unique mating order of the signal connectors of the two blocks, enabling orientation determination via connection of a single nubbin mating pair. For an example of how a set of such connectors could be laid out on a block to operate as described, see FIGS. 28A and 28B wherein the male connector arrays 2802 and female connector arrays 2804 are shown on a rectangular parallelepiped block with eight connectors on the top and bottom.

Returning to the simplified exemplary embodiments, the connector "nubbins" used are the single-axis-rotationally-invariant, infinitely variable concentric rings or cylinders shown in FIGS. 5A-5D. Owing to the grid layout of adjacent connectors and the "two-nubbin" requirement, individual mating nubbins on mating blocks are connectable at integer multiples of 90 degree rotational increments relative to each other.

Figure 29:
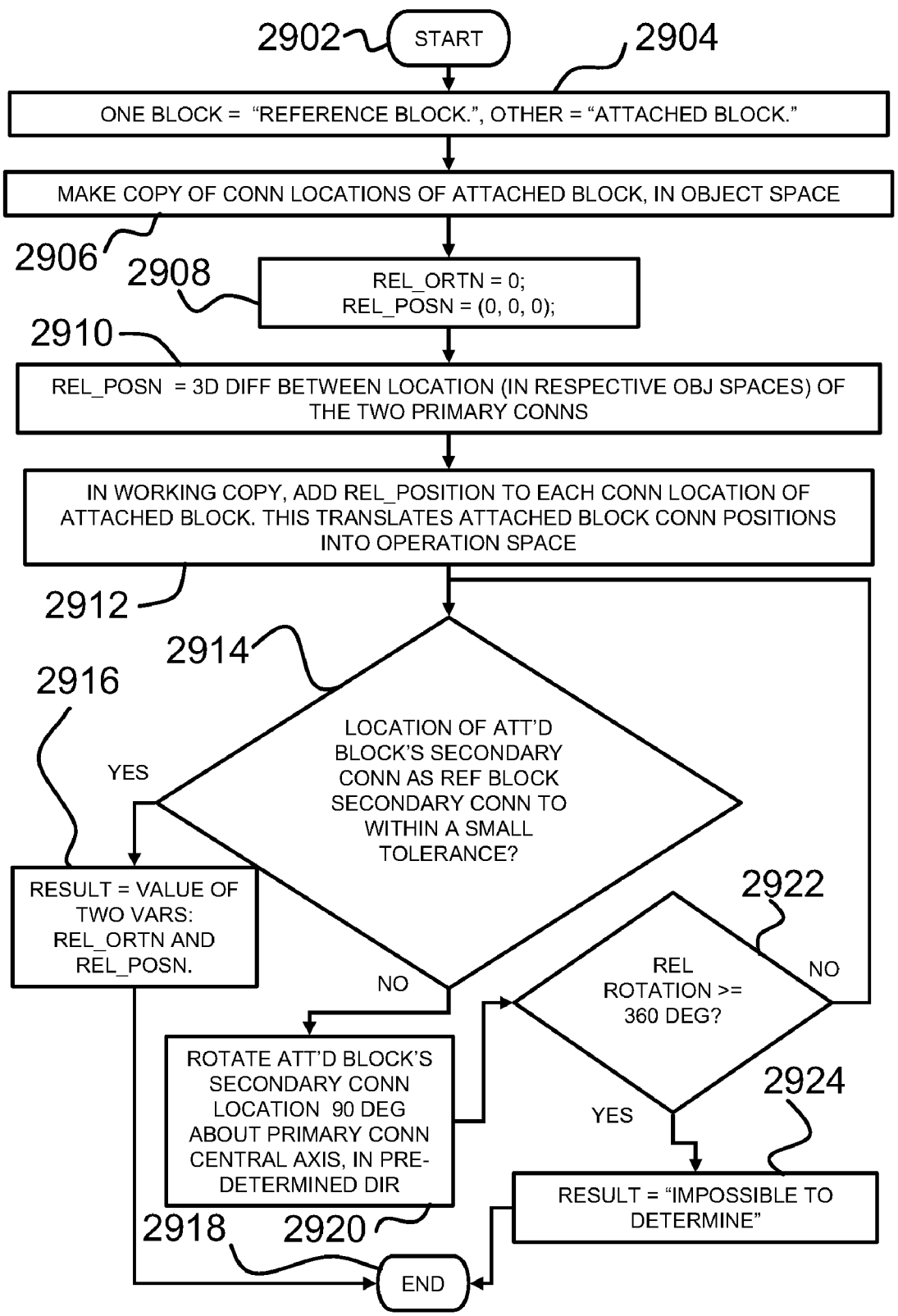

The logic of the game module used in the preferred embodiment to determine the relative position and orientation of adjacent mating blocks is shown in FIG. 29. The positional accuracy achievable with the algorithm described is "to within a small tolerance" and the rotational accuracy is ninety (90) degree increments.

For simplicity in the embodiment described herein, further assumptions are taken for the routine described by FIG. 29 as follows.

Blocks are simple shapes and similar as follows (the blocks shown in FIGS. 2A and 2B satisfy each of these assumptions):

Each block is a rectangular parallelepiped.

Each block has connectors of one gender on its "top" face and connectors of the opposite gender on the "bottom" face, "top" and "bottom" being construed to be facing "up" and "down" respectively in the space in which the blocks exist.

All blocks have the same gender as each other on the top face.

All blocks have the same gender as each other on the bottom face.

There are no connectors on the sides of any block.

Any group of connectors are arranged in a two-dimensional array.

The unit distance between connectors on one axis of the two-dimensional array is the same as the unit distance between connectors on the other axis.

The unit distance(s) between connectors on a given face of a block is the same among all blocks and faces.

The origin in block object space is positioned identically for each block relative to the various two-dimensional connector arrays on the block such that, in two dimensions of the block's three-dimensional object space, (and due to some of the above assumptions about the connectors being arranged on a two-dimensional array with equal unit distances on each axis,) the location of any connector is given as an integer multiple of the common unit distance plus some offset.

The third dimension of the connector location varies with block height, but for simplicity here assume all blocks are the same height, "height" being taken as some measure between the block's "top" and "bottom" faces.

FIG. 29 shows the game logic used to determine relative position and orientation between two mating blocks, to a degree of positional accuracy of a small tolerance and of rotational accuracy of 90 degree increments about the axis normal to the plane of the two mating faces of the blocks.

The data known to the game prior to attempting this calculation is as follows:

1. At least two connectors from each of the two mating block are connected to each other. In other words, there are at least two mating pairs of connectors between the two blocks;

2. The locations in their respective block's object space of the mating connectors;

3. The designations of each connector and its mate in each of the two mating pairs; for example, "Connector_00 on the first block is mated with connector_07 on the second block, and connector_01 on the first block is mated with connector_06 on the second block."

The objective of this calculation is to determine the relative orientation of the two mating blocks using the above information and the assumptions referred to above. That information and those assumptions constrain the problem in the exemplary embodiment to determining which one of four angles are the blocks mated relative to each other: 0, 90, 180 and 270 degrees. For other arrangements (e.g. a different grid layout of the connectors) the problem might be smaller or larger and the assumptions and requirements tailored to allow for a constrained determination of relative orientation between mating blocks.

The basic algorithm is:

1. Translationally transform the world-space position of each of the attached block connectors into the object space of the reference block. The difference in position in the respective block object spaces of the primary connectors are used for this purpose. This puts the location of the secondary connector into the reference block object space, but possibly not at the same location as its mate.

2. Calculate the difference in position between the two secondary connectors. If the difference is within a small tolerance, we are done. The relative orientation between the two blocks is zero degrees. The relative position is the position difference between the primary connectors calculated in the first step.

3. If not done yet, rotate by ninety degrees the attached block about the primary connector's main axis (i.e. the axis normal to the mating faces of the blocks.) Return to Step 2. If no solution is found, return a message to that effect.

As shown in FIG. 29, after starting the routine 2902, the game chooses one block arbitrarily as a frame-of-reference block 2904. For the purposes of this description this block is called the "reference block" and the other block the "attached block." The operations described here take place in the same mathematical space as the object space of the reference block. That is, the spatial coordinate system used by the block physical data and the operations performed on it is positioned, oriented and scaled exactly as the local object coordinate system used to describe the reference block. In this description this space is called the "operation space." For any block used as the reference block, the location and orientation of each of its connectors in that block's object space are identical to their respective counterparts in the operation space. Two connectors on each block are required to be mated to their respective counterparts on the mating block. In this description, one of these connectors is called the "primary" connector and the other the "secondary" connector. The respective mate on the mating block is assigned the same name. Thus the primary connector on the reference block mates to the primary connector on the attached block and the secondary connector on the reference block mates to the secondary connector on the attached block.

The game reads the position (in the reference block's object space, which is also the operation space,) of the primary connector on the reference block. The designation of "primary" versus "secondary" connectors is arbitrary.

The real-world blocks typically have an object space origin and orientation either identical (for the case of identically shaped blocks) or else similar to each other. The scale of the coordinate system used on all blocks is the same. Therefore the coordinate systems of the two real-world blocks cannot typically be coincident (e.g. since they are physical entities they cannot easily occupy the same space.) Thus, the connector location of the "attached" block, typically provided to the game in the object space of that block, resides in a space different from the operation space and must be transformed to the operation space in order to facilitate its usage in calculations.

The game reads the position in its block's object space of the primary connector on the attached block. As mentioned, this position is not in the same space as the operation space and to make calculations easier a transformation is performed to bring the connector's position and orientation into the operation space, as follows, described from the game program's perspective. A working copy is made of the list of the connector locations of the attached block 2906 as provided in that block's physical data dataset. This copy hereafter is used in the remainder of the tasks in this operation. A variable called "RELATIVE_ORIENTATION" (abbreviated as "REL_ORTN") is created, set equal to zero and a three-dimensional (3D) variable is created called "RELATIVE_POSITION" (abbreviated as "REL_POSN) with each of its components (e.g. x, y, z) equal to zero 2908. The "fourth dimension" typically represented as "w" for use in matrix math calculations is assumed to equal "1.0". Using the connector locations in their respective object spaces, the difference in each dimension is computed between the location of the primary connector on the attached block and location of the primary connector on the reference block and each of the three-dimensional components (e.g. x, y, z) of the relative position variable REL_POSN is set equal to its counterpart in this difference 2910.

A physical example of this operation involves the steps of: Setting CR=(1, 2, 3)=Location of primary connector on reference block in object space of reference block; Determining CA=(−1, 2, 1)=Location of primary connector on attached block in object space of attached block; Calculating DIFF=CR−CA=( (1−1), (2−2), (3−1) )=(2, 0, 2)=3D difference in object space locations of primary connectors and then providing REL_POSN=DIFF.

Using the difference just calculated, the connector locations on the attached block are transformed into the object space of the reference block. In the working copy, add this difference to each connector location provided in the attached block's physical data dataset 2912. This results effectively in a translation of the connector locations such that the primary connectors of the two mating blocks are coincident, located at the same location in the operation space to within a small tolerance. Two examples for this type of calculation are provided in Table 3.

TABLE 3

FIRST EXAMPLE:

CA_original = (−1, 2, 1);
CA_transformed = CA_original + DIFF = ((−1 + 2), (2 + 0), (1 + 2)) = (1, 2, 3);
Note that this is identical to CR.
SECOND EXAMPLE:

CA2_original = (−1, 1, 1);
CA2_transformed = CA2_original + DIFF = ((−1 + 2), (1 + 0), (1 + 2)) = (1, 1, 3);

A determination is then made if the secondary connector on the attached block located at the same location as the secondary connector on the reference block in the operation space to within a small tolerance 2914. If so, the operation is complete. The result is the current state of the two variables: relative orientation and relative position (REL_POSN and REL_ORTN). If not, the attached block's secondary connector location is rotated in the working copy 90 degrees about the primary connector in a pre-determined direction (e.g. clockwise as looking at the connector in a downward direction in the operation space) 2920. This direction is to remain the same for all such rotations, if this operation is performed more than once. The rotation can be performed by standard matrix operations, possibly with the addition of a fourth component equal to unity to each 3D point in the working copy.

Note that since the rotation is carried out about the primary connector's location, the primary connector's location does not change. A determination is then made if relative rotation is equal to or exceeds 360 degrees 2922. If not then the algorithm returns to step 2914. If so, then the operation is complete. The result is "impossible to determine."

As previously discussed, the game and block interaction contemplated by the invention allows the game to scale and manipulate the structures created using the blocks to meet the user's needs within the game environment. The game program contains routine(s) to determine autonomously or to allow user to specify: location, orientation and scale, hereafter referred to as translation, rotation and scale (TRS), in virtual space to place the block structure at all times, initially, as block construction proceeds and as the game proceeds.

In one embodiment, as block construction proceeds, the likeness of the block structure is drawn in a sub-window of the game using a TRS such that the whole structure remains framed in the sub-window. When the user wishes to insert the structure into the game world, the user indicates this to the game using standard input methods such as keystrokes or menu selections. Similar input methods are used to position, orient and scale the structure to the user's wishes. Additions or changes to the block structure can be processed using a policy such as "keep the TRS as specified by user and allow all changes regardless of how the result interacts (such as unpleasant intersections) with the game world" or "alter the TRS such that no unpleasant interactions with the game world occur, if possible."

In another embodiment, the construction of block structure can be shown in the game world as construction proceeds, initially using default TRS or TRS calculated based on the current game state (such as gravity orientation and camera TRS and other camera parameters), for the block structure, and altering block structure TRS based on user input or on one or more policies as described above.

For example, at the start of block structure construction, the position of the structure can be centered onscreen and orientation and scale can be set to a default such as scale=1.0 in all dimensions and orientation "believable with acceptable aesthetics." For example orientation can be set such that if the game uses a simulated gravity field then the top of the likeness of the base block is oriented orthogonally to the gravity vector in the game world such that if the orthonormal of the top face(s) point outward from the block then the orthonormal points in the opposite direction from the gravity vector. Such an orientation requirement specifies one of the three degrees of freedom of orientation; the other two can be determined based on camera orientation relative to the gravity vector such that a pleasing likeness is drawn of the block or at least one showing as much of the block's virtual three-dimensional shape as possible, such as an orthographic view of the block. If orientation- and motion-sensing features are used in the embodiment (as described elsewhere), then the orientation of the block structure can be set to approximate the orientation of the structure in the physical ("real") world, as seen by the user both in the real world and in the game world.

In this embodiment, location can be calculated to be onscreen in a position close to but not interfering with any game objects or with any relevant game characters (such as the player's character), resting on a surface in the game world such that the result is believable or at least not too unbelievable. TRS can be altered as block construction proceeds based on user input or on one or more policies as described above.

In any embodiment, if necessary, the block structure can simply "float" somewhere onscreen (TRS irrelevant) with the understanding that the user will subsequently provide input to set the TRS to something more desirable.

The game can contain a set of routines to allow the user to store and recall (either directly or indirectly) the current state of the block structure for future use either during the same game session, or if the console contains the proper hardware such as a hard drive, for future game sessions even if the power is removed from the console. The recalled dataset includes all of the data (or keycodes that can be used to access such data) that the original block structure provided. Dynamic data information is a special case as described below.

Such storage can be centralized and performed using an open format so that a block structure created in one game can be used in a different game.

Recalled data has many uses. Some examples of this are: In conjunction with an ability to "attach" current and stored structures to other (current or stored) structures or otherwise combine them, recalled data allows the user to build larger structures than a given physical set of blocks would allow. By using TRS variation along with data recall, objects of even more varying size, complexity and detail can also be made. Data recall also allows the user to build structures for a game character to use at some later time, in order to save time during gameplay and to build structures for use together as a group such as a set of furniture, or a vehicle plus some tools to carry in the vehicle, etc. Block structures from many users can be uploaded over a network and placed (via TRS adjustments) and stored in a massive online world, accessible by many users simultaneously. Such a world is described in more detail elsewhere in this document.

The means to recall the block structure and all its related data (or keycodes to same) from storage includes the means to reconstruct the block structure such that its appearance and behavior in the game is similar to that of a structure that is built "live" by the user. The dynamic (re-)use of static data from the block such as sounds and animation cycles is not restricted by any physical limitation. However, as such data is often related to some physical dynamic component on a block, its use (for example, that a certain event triggers playback of a sound) may need to be re-mapped.

The (re-)use of dynamic physical block components is limited in such recalled block structures to those for which the use of such physical counterparts in the game world can be simulated by game routines. Otherwise, such components can be disabled or otherwise ignored in the game world.

For example, if a user builds a block structure with a set of wheel sensors as previously described with respect to FIGS. 16A, 16B, 17A and 17B then during a "live" session with such a structure, the physical, real-world wheel sensors can provide the game sensor data which the game can use to attempt to provide movement to the game-world block structure in a way that simulates or reproduces the movement of the real-world structure. However, if such a structure is stored and recalled later, with no real-world counterpart in existence (for example, if the user dismantled the original structure,) then there are no real-world sensors to drive the game world wheels.

In this example, the use of the wheels on the recalled block structure can be mapped to other game functions such as a standard user input device like a joystick. The wheels can be made to behave as a coherent unit which moves and turns based on joystick controls. This mapping can be done in any manner similar to previously described with respect to usage of unrelated data, such as performed automatically by the game or by a central mapping service, or by user interaction, or by using "hints" provided in the original wheel sensor description data.

As an alternative example, if a stored block contains a pushbutton, then upon block recall the activation of that button can be mapped to one of the buttons on the game controller. Alternatively, the wheels and the button in the examples just given could be disabled by the game, but still drawn or not, as preferred and/or controlled by the user and/or the game.

A user is typically in possession of a limited number and variety of individual blocks. While it is possible to create a great number of different and interesting block structures using a relatively small set of blocks, the possibilities increase tremendously when the user can store and recall game-world block structures and then attach them to or otherwise combine them with a newly-created real-world structure and/or other structures recalled from storage, or one or more copies of any of those structures. Additionally, using TRS manipulation on any piece as desired greatly increases the variety possible for levels of detail.

Using these methods, the user can create block structures of nearly any size and shape using just a relatively small set of real-world blocks. Coarse construction details can be made by building a block structure (or building, storing, recalling and adding to a series of structures) at relatively larger (and larger and larger) scales, and finer details can be added at smaller (and smaller and smaller) scales.

Using simple copy and repeat techniques, for example, the user could build a large, circular stadium: First build, for example, one thirty-six degree section of the arc that makes up the outer wall of the stadium. Then copy and repeat that section until there are ten of them. Then use translate and rotate functions to move the pieces until they form a circle. A seat-shaped block structure could be copied many times to populate the stadium with seats.

In conjunction with an ability to "attach" current and stored structures to other (current or stored) structures or otherwise combine them, the ability to adjust the translation, rotation and scale (TRS) for a given block structure enables the creation of highly detailed objects as well as objects with a large variation in feature size. More simply, it allows the creation of sets of objects which have different mean sizes, such as a set of bookshelves as well as a set of giant cliffs on the side of a continent.

The ability to shrink objects down to sizes significantly smaller than other objects such as a game character offers the user the ability to create objects of nearly any apparent shape, using basic elemental building blocks. This is similar to the quantization of a two-dimensional image into a series of discrete pixels, each of which is square or some other shape, but when small enough compared to the overall image can be made to appear to trace a nearly perfect curve such that an image of nearly anything can be reproduced.

Using these store-and-recall-data and the TRS-adjustment features, the user (or a group of users who have the means to share data) could build an entire universe. For example, some small utensils such as knives and forks could be built first. Note that they can be built at any scale in the game world initially, then scaled as needed later. Position and orientation are, as noted above, also adjusted as necessary. Larger objects could then be made and scaled such as cabinets and other furniture. Buildings could then be built which would likely be scaled to be larger than the previously mentioned objects, because a building's main features are larger than those of, say, a chest of drawers which itself likely has main features that are larger than those of, for example, a fork or knife. Vehicles, sidewalks, streets, city features could be built next, at ever larger scales, then geographical features and planetary features. Then, other planets could be made, and other star systems, and so on.

On any given object, the feature scale can be varied significantly. For example, in a building, single rectangular parallelepiped blocks can be used as individual stairs. But a whole collection of such blocks could be used at a much smaller scale to build a nicely detailed handrail with support posts that runs up those stairs. Architectural details could be built and scaled similarly.

A further application of using block structure data storage, recall, combination and the like is the collection and connection of multiple users' block structure datasets in and into one or more central game "worlds" in which multiple users can "play." The various commercially available "massively multiplayer online games" (MMOGs) such as Blizzard's "World of Warcraft" are examples of similar worlds.

For example, a central game world can be developed consisting of a single relatively large sphere or some other shape, representing a planet or a large region of a continent. Online or similar access is provided by the central game world "server" program, and all users wishing to take part in the world use a video game console enabled with the means to connect to the central game world via this access. On that console users play the "client" side of the game program, which, along with the server and the handshaking between the client and server contains the means to provide to the user a relatively updated and current view of the central game world, and keep the state of the game mostly equivalent within some time delay between the client and the server and vice versa.

As in other embodiments employing the present invention, the user creates real-world block structures for various uses in the game world. Since as mentioned the state of the game is kept mostly equivalent on the client and server, as the user performs actions on the client side such as building a block structure, the game world on the server is updated similarly, within some time delay. This enables all players in the system to eventually see changes made by themselves and by all other players. The time lag is kept as small as possible using some or all of the efficiencies mentioned elsewhere for this invention along with standard MMOG programming techniques for this purpose.

With many users creating structures and possibly also using the re-use of block data as previously described, very large, complex interesting worlds can be created, and can be made to persist over long periods such as many years.

When structures can be stored, they become valuable as assets that might be traded. In a collaborative world, for example, object(s) from one user might have value for other users and those users might enjoy the opportunity to trade something for the object(s). Block structures that are made available for trade can be traded using any of various trading models from the real world and/or the online world. Secondlife.com is an online example of trading virtual assets for assets that can be virtual or real. For example, real-world currency can be used to purchase online currency, which is the legal tender of the online world. A 3D modeling program such as Autodesk's Maya can be used to mimic the construction of block structures from an appearance standpoint. A central registry can be used for block validation at time of block structure registration for sale.

A typical object in many commercially available video games is an on-screen character or "avatar" representing the user. The user uses the game controller to move the character through the game world and perform actions therein, essentially playing the game through the character. A useful application for a given block structure, therefore, is to act as the user's on-screen game character. Such characters are, in games using current standard game features, well articulated such that their movement is one or several of: complex; realistic (e.g. "humanoid"); believable; interesting. Many game characters' bodies can be animated in such as way as to mimic human or animal or fantasy "creature" behavior.

Therefore a useful feature for the game to be able to perform on block structures (automatically or under user guidance) is that of articulation. Standard procedure to enable a pre-packaged game character to move about a world in a humanoid way, for example, is to "rig" the object as follows. Develop the outer skin appearance of the character, then develop an underlying skeleton consisting of bones and joints and then bind the skin to the skeleton using any of several standard methods. Such methods might include "rigid" or "smooth" binding, with possible additional features such as weighting to allow fine control of how given areas of the skin are affected by the movement of nearby or otherwise specified joints.

Automated articulation can mimic the industry methods described using terms such as, "automatic rigging." Manual rigging by the user can be similar to how the leading 3D animation packages (such as Autodesk Maya) enable rigging, as just described. The mapping of user controls (from the standard game controller(s) as well as from specific block features) to skeletal movement can be automatic by special game routine or by user intervention, as discussed previously with respect to usage of unrelated data.

The final rendered appearance of the block structures can be altered at any time using special game modules. For example, the color of a solidly colored block can be changed from red to blue. A more complex application is to apply a brick texture to a wall-shaped block structure.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for physical interaction with a host device application program comprising:
    a host device with an associated interactive application;
    a plurality of physical building blocks each having at least one connector operable for providing connection paths for input and output for communications to one or more of the remaining blocks in said plurality wherein the at least one connector comprises a first connector moiety further including a power receptacle cylinder and a data receptacle cylinder and a second connector moiety including a power connection mating cylinder and data connection mating cylinder, and providing, means for detection of connection paths through the plurality of physical blocks;
    a bidirectional interface for the connection paths of the plurality of physical blocks to the host device; and,
    means for altering the interactive application responsive to the connection paths.

2. The system of claim 1 wherein the at least one connector further provides power distribution to one or more of the remaining blocks in said plurality.

3. The system of claim 1 wherein one of the plurality of blocks comprises a base block and the interface for the connection paths to the host device comprises an external communications port integral to the base block.

4. The system of claim wherein the at least one connection point comprises a plurality of geometrically spaced connectors having a first moiety on one face of each block and a second moiety on a second face of each block to removably and selectably attach to at least one first moiety from an adjacent block forming a structure.

5. The system of claim 4 wherein relative geometric position of adjacent blocks is determined by detection of connection paths through the attached first and second moieties of the adjacent blocks.

6. The system of claim 1 wherein the the first connector moiety on each block has a receptacle cylinder with a plurality of angularly spaced contacts and the second connector moiety on each block has a mating cylinder with a plurality of angularly spaced connecting fingers received in the first connector moiety of an adjacent block, the relative geometric position of the adjacent blocks determined by identification of an electrical connection of contacts and fingers.

7. The system of claim 1 in which the first connector moiety power receptacle cylinder and data receptacle cylinder are concentric and the second connector moiety power connection mating cylinder and data connection mating cylinder are concentric.

8. The system of claim 4 wherein the means for detection of connection paths comprises a microprocessor in each block connected to receive communications through each connection point, each block having a unique identifier and each microprocessor, in response to a request signal from the host, providing the identifier and first moiety geometric location for each adjacent block attached to each second moiety on said each block.

9. The system of claim 1 wherein at least one of said plurality of blocks incorporates a cradle for a video game controller.

10. The system of claim 9 wherein said cradle includes a communications interface for exchanging communications with said controller and wherein the host device is integrated in the controller.

11. The system of claim 9 wherein the interface to the host is interconnected to said cradle connector for transmitting signals from said video game controller to said host.

12. A system for physical interaction with a host device application program comprsing:
    a host device with an associated interactive application;
    a plurality of physical building blocks each having a plurality of geometrically spaced connectors having a first moiety on one face of each block and a second moiety on a second face of each block to removably and selectably attach to at least one first moiety from an adjacent block forming a structure, each connector providing connection paths for input and output for communications to one or more of the remaining physical blocks in said plurality, said at least one connector further providing power distribution to one or more of the remaining physical blocks in said plurality, one of said plurality of physical blocks comprising a base block;
    a microprocessor in each physical block connected to receive communications through each connector, each block having a unique identifier and each microprocessor, in response to a request signal from the host, providing the identifier and first moiety geometric location for each adjacent block attached to each second moiety on said each block for detection of connection paths through the plurality of blocks wherein relative geometric position of adjacent blocks is determined by detection of connection paths through the attached first and second moieties of the adjacent blocks and responsive to a second request signal from the host activating an outgoing data display element in the block;
    an external communications port integral to the base block as an interface for the connection paths of the plurality of physical blocks to the host device; and,
    means for altering the interactive application responsive to the connection paths.

13. A method for interactive play with a video game comprising the steps of:
    providing a base block for connection to a video game console and commumcation with the video game;
    providing a plurality of phvsical blocks for physical interconnection to the base block;
    constructing a structure by attachment of the plurality of blocks to the base block;

reading the structure into the video game through the base block with determination of relative block orientation by identification of an electrical connection of angularly spaced data contacts in a first connector moiety and a second connector moiety on each block having mating angularly spaced data contacts received in the first connector moiety of an adjacent block; and, displaying the structure in the virtual world of the video game as a virtual structure.

14. The method of claim 13 wherein the step of displaying the structure further comprises the steps of:
   determining the physical structure of the attached blocks and base block;
   converting the determined physical structure into a virtual structure for display in the virtual world; and,
   performing translation, rotation and scale (TRS) operations on the virtual structure to provide desired appearance in the virtual world.

15. The method of claim 14 wherein converting the determined physical structure includes establishing appearance information for the display of the virtual structure in the virtual world.

16. The method of claim 14 further wherein the attached blocks include dynamic elements and wherein the step of converting the determined physical structure comprises
   monitoring the status of static data for orientation of connected blocks:
   monitoring the dynamic data for dynamic elements of each block; and
   wherein the step of performing TRS includes altering desired appearance based on the dynamic data.

17. The method of claim 16 wherein the dynamic elements are selected from the set of motion sensors, pushbuttons, knobs, trackballs, keyboards, microphones, cameras, infrared sensors.

18. The method of claim 13 further comprising:
   providing a mating cradle for a video game controller;
   and wherein the step of performing TRS includes translating data from motion sensors in the video game controller for establishing appearance information for the display in the virtual world.

19. The method of claim 17 further comprising adding data from the dynamic elements to a game listing process and processing the data for output by the game.

20. The method of claim 17 wherein the step of reading the structure comprises establishing a block identifier each block in the structure; updating block structure based on data associated with the block identifiers.

21. The method of claim 17 further comprising:
   determining block identifiers for blocks having dynamic elements;
   establishing a query cycle for such identified blocks at a rate to retrieve dynamic data.

22. The method of claim 13 wherein the step of reading the structure in includes reading physical properties associated with each block and wherein the step of performing TRS includes applying a physics simulation engine to the structure based on the physical properties data.

23. The method of claim 13 further comprising the step of storing the structure in the video game and recalling the stored structure for use in the video game.

24. The method of claim 13 wherein the step of recalling the stored structure includes the step of using TRS to virtually attach the stored structure to a constructed structure.

25. The method of claim 23 wherein the step of recalling the stored structure includes the step of using TRS to virtually attach the stored structure to a second recalled stored structure.

* * * * *